（12）United States Patent
Kojima et al.

(10) Patent No.: US 8,526,761 B2
(45) Date of Patent: Sep. 3, 2013

(54) IMAGE PROCESSING APPARATUS AND IMAGE SENSING APPARATUS

(75) Inventors: Kazuhiro Kojima, Higashiosaka (JP); Haruo Hatanaka, Kyoto (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 225 days.

(21) Appl. No.: 12/972,054

(22) Filed: Dec. 17, 2010

(65) Prior Publication Data

US 2011/0150349 A1 Jun. 23, 2011

(30) Foreign Application Priority Data

Dec. 17, 2009 (JP) ................................ 2009-286501

(51) Int. Cl.
*G06K 9/20* (2006.01)

(52) U.S. Cl.
USPC .......................................................... 382/283

(58) Field of Classification Search
USPC .......................................................... 382/283
See application file for complete search history.

(56) References Cited

U.S. PATENT DOCUMENTS

| | | | | |
|---|---|---|---|---|
| 7,418,150 | B2 * | 8/2008 | Myoga | 382/260 |
| 2002/0140823 | A1 * | 10/2002 | Sakurai et al. | 348/207.99 |
| 2005/0122402 | A1 * | 6/2005 | Kumaki | 348/208.1 |
| 2007/0086675 | A1 * | 4/2007 | Chinen et al. | 382/284 |
| 2007/0172141 | A1 * | 7/2007 | Bando | 382/261 |
| 2007/0286590 | A1 * | 12/2007 | Terashima | 396/125 |
| 2009/0028390 | A1 * | 1/2009 | Hayaishi | 382/106 |
| 2009/0096897 | A1 * | 4/2009 | Saito | 348/241 |
| 2009/0167928 | A1 * | 7/2009 | Asukabe et al. | 348/345 |
| 2009/0207282 | A1 * | 8/2009 | Sasaki et al. | 348/240.3 |
| 2009/0284610 | A1 * | 11/2009 | Fukumoto et al. | 348/208.99 |
| 2010/0149384 | A1 * | 6/2010 | Iijima et al. | 348/241 |

(Continued)

FOREIGN PATENT DOCUMENTS

| | | |
|---|---|---|
| JP | 2000-105819 A | 4/2000 |
| JP | 2005-229198 A | 8/2005 |

(Continued)

OTHER PUBLICATIONS

"Digital Image Processing" second edition by Okutomi, CG-ARTS Association; Pages from 108 to 110, 122 to 124, and 131 to 133; Date of publication: Mar. 16, 2006.

*Primary Examiner* — Stephen R Koziol
*Assistant Examiner* — Jonathan S Lee
(74) *Attorney, Agent, or Firm* — NDQ&M Watchstone LLP

(57) ABSTRACT

An image processing unit includes a second-taken image generation unit which performs a blurring process on a first taken image including a plurality of small areas so as to generate a second taken image, a focus degree deriving unit which derives a focus degree of each small area, and a combination process unit which combines each small area of the first taken image with each second small area of the second taken image corresponding to each small area of the first taken image. The combination process unit sets a mixing ratio of the second taken image in the combination to a larger value as a focus degree of each small area derived by the focus degree deriving unit is smaller. The second-taken image generation unit includes a face area detection unit which detects a face image area from the first taken image, and a blurring process unit which performs the blurring process on the first taken image on the basis of the detected face image area so as to generate the second taken image.

6 Claims, 30 Drawing Sheets

(56) References Cited

U.S. PATENT DOCUMENTS

2010/0157110 A1* 6/2010 Hatanaka et al. ............ 348/241
2010/0157127 A1* 6/2010 Takayanagi et al. ..... 348/333.02
2013/0050542 A1* 2/2013 Asukabe et al. ............ 348/241

FOREIGN PATENT DOCUMENTS

| | | |
|---|---|---|
| JP | 2006-072770 A | 3/2006 |
| JP | 2006-211139 A | 8/2006 |
| JP | 2007-265390 A | 10/2007 |

* cited by examiner

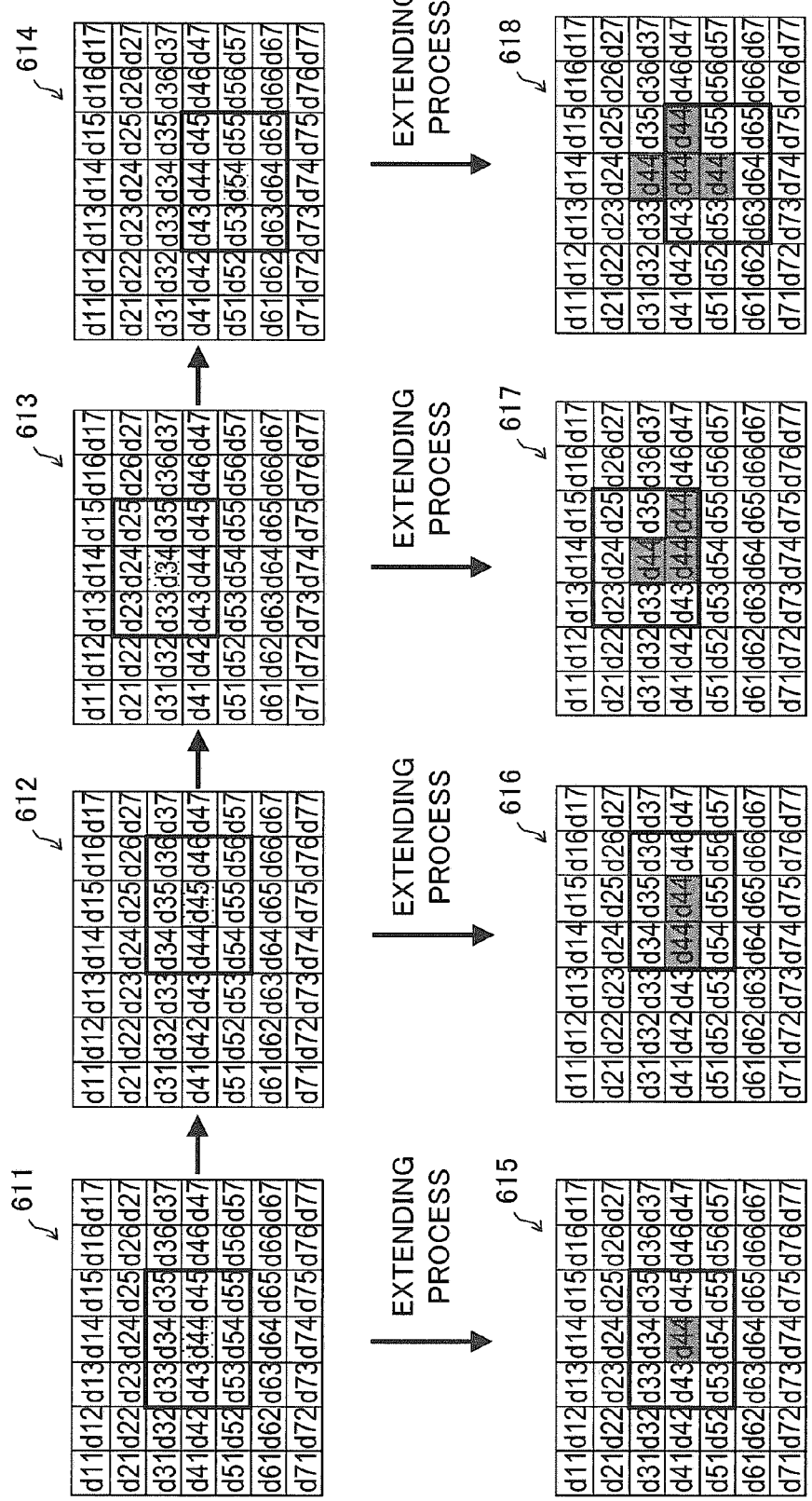

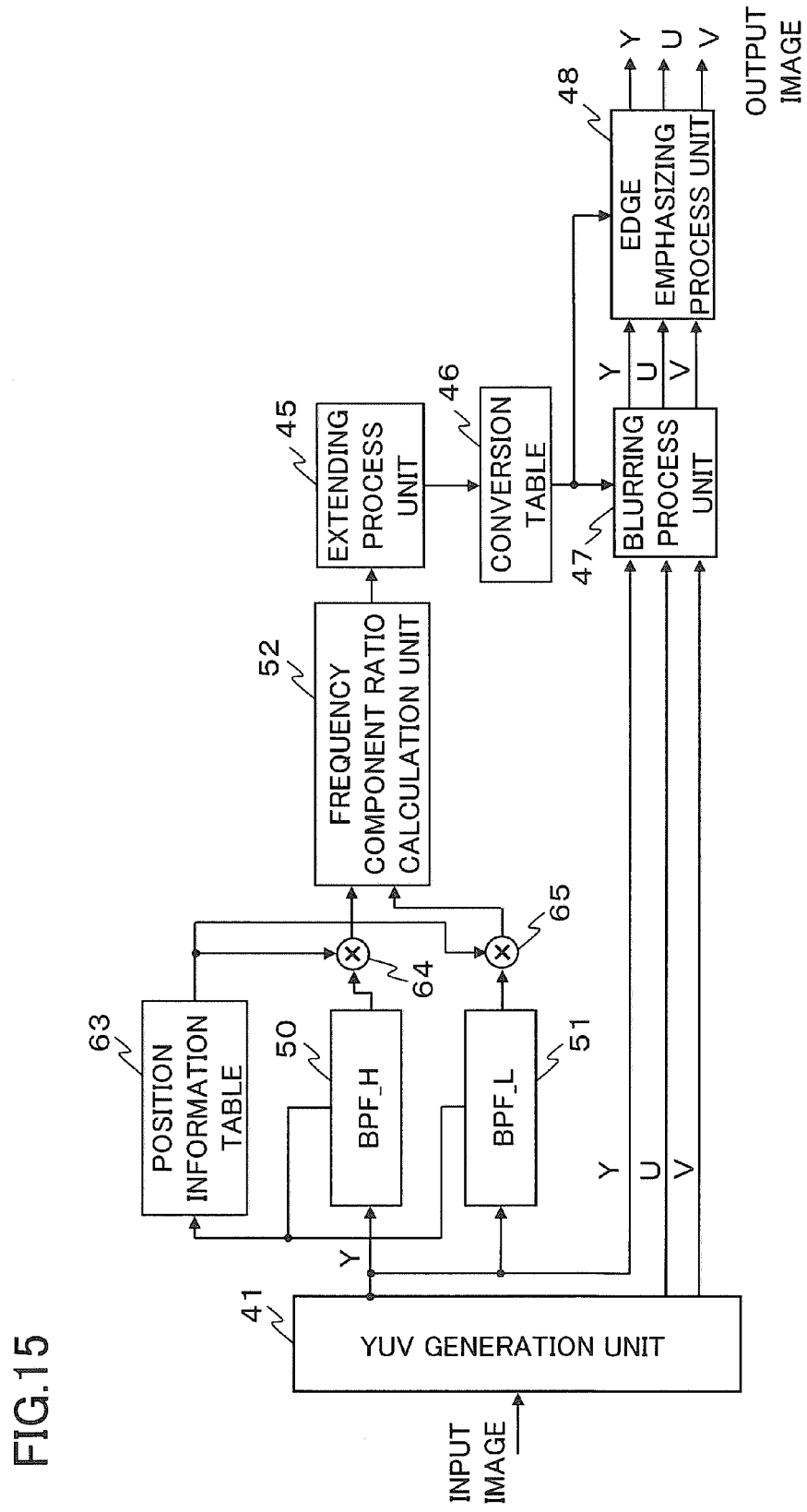

FIG.21A

| a | b | c | d | e |
|---|---|---|---|---|
| f | g | h | i | j |
| k | l | m | n | o |
| p | q | r | s | t |
| u | v | w | x | y |

BLURRING FILTER

FIG.21B

| Ca | Cb | Cc | Cd | Ce |
|---|---|---|---|---|
| Cf | Cg | Ch | Ci | Cj |
| Ck | Cl | Cm | Cn | Co |
| Cp | Cq | Cr | Cs | Ct |
| Cu | Cv | Cw | Cx | Cy |

BLURRING FILTER

| 0 | 0 | 0 | 0 | 0 |
|---|---|---|---|---|
| 0 | 1 | 0 | 0 | 0 |
| 0 | 0 | 0 | 1 | 0 |
| 0 | 0 | 1 | 0 | 1 |
| 0 | 0 | 1 | 0 | 0 |

MASK FILTER

FIG.26B

| 0 | 0 | 0 | 0 | 0 |
|---|---|---|---|---|
| 0 | 1 | 0 | 0 | 0 |
| 0 | 0 | 0 | 1 | 0 |
| 0 | 0 | 1 | 0 | 1 |
| 0 | 0 | 1 | 0 | 0 |

MASK FILTER

×

| Ca | Cb | Cc | Cd | Ce |
|---|---|---|---|---|
| Cf | Cg | Ch | Ci | Cj |
| Ck | Cl | Cm | Cn | Co |
| Cp | Cq | Cr | Cs | Ct |
| Cu | Cv | Cw | Cx | Cy |

BLURRING FILTER

=

| 0 | 0 | 0 | 0 | 0 |
|---|---|---|---|---|
| 0 | Cd | 0 | 0 | 0 |
| 0 | 0 | 0 | Cm | 0 |
| 0 | Cg | 0 | Cq | 0 |
| 0 | 0 | Ck | 0 | 0 |

CORRECTED BLURRING FILTER

IMAGE PROCESSING APPARATUS AND IMAGE SENSING APPARATUS

CROSS-REFERENCE TO RELATED APPLICATIONS

This nonprovisional application claims priority under 35 U.S.C. §119(a) on Patent Application No. 2009-286501 filed in Japan on Dec. 17, 2009, the entire contents of which are hereby incorporated by reference.

BACKGROUND OF THE INVENTION

1. Field of the Invention

The present invention relates to an image processing apparatus that performs image processing and an image sensing apparatus such as a digital camera.

2. Description of Related Art

Currently, there are widely spread image sensing apparatuses such as a digital still camera or a digital video camera using a solid state image sensor such as a charge coupled device (CCD) sensor or a complementary metal oxide semiconductor (CMOS) sensor.

In order to obtain a taken image with so-called "bokeh", which is an image in which a focused subject is clear while other subjects are blur among imaging target objects, namely, an image in which a generally focused subject is emphasized and enhanced, it is necessary to use, for example, an image sensing apparatus having a large size solid state image sensor or an image sensing apparatus having a large diameter lens for imaging a taken image on the solid state image sensor. This type of image sensing apparatus enables imaging with a sufficiently small depth of field, so that a taken image with so-called "bokeh" can be obtained, in which a focused subject is enhanced.

However, when using an image sensing apparatus having a small size solid-state image sensor and a small diameter lens such as a so-called compact type digital camera, imaging with sufficiently small depth of field cannot be performed so that it is difficult to obtain a taken image with "bokeh". In addition, even if an image sensing apparatus having a large size solid state image sensor and a large diameter lens is used, it is difficult to obtain a taken image in which a focused subject is emphasized by making a luminance difference, a color saturation difference, or the like between the focused subject and other subjects.

Note that there is a conventional method of obtaining an image with "bokeh" by image processing. In this conventional method, first, one reference image data is split into two independent image data, which are image data of a subject area and image data of a background area. Then, a blurring process is performed on the sprit background image data, and then the background image data after the blurring process and the reference image data are combined. After the combining process, an anti-aliasing process is performed for preventing a boundary between the background area and the subject area from appearing jaggy and hence unnatural. Thus, an attempt is made to obtain an image with "bokeh". Even if an image with "bokeh" could be obtained by the conventional method, the complicated process described above would be necessary.

SUMMARY OF THE INVENTION

An image processing apparatus according to the present invention includes a second taken image generation unit which generates a second taken image constituted of a plurality of second small areas by performing a blurring process on a first taken image constituted of a plurality of small areas, a focus degree deriving unit which derives a focus degree of each small area of the first taken image, and a combination process unit which combines each second small area of the second taken image corresponding to each small area of the first taken image with each small area of the first taken image. The combination process unit sets a mixing ratio of the second taken image in the combination process to a larger value as the focus degree of each small area derived by the focus degree deriving unit is smaller. The second-taken image generation unit includes a face area detection unit that detects a face image area from the first taken image, and a blurring process unit that performs the blurring process on the first taken image on the basis of the detected face image area so as to generate the second taken image.

Meanings and effects of the present invention will be more apparent from the following description of an embodiment. However, the following embodiment is merely an example of the present invention, and meanings of the present invention and terms of elements are not limited to those described in the following embodiment.

BRIEF DESCRIPTION OF THE DRAWINGS

FIG. 8 is a diagram illustrating the extending process according to Example 1 of the present invention.

FIG. 15 is a diagram illustrating an action of the emphasized image generation process according to Example 5 of the present invention.

FIGS. 21A and 21B are diagrams illustrating a blurring filter used by a blurring process unit in Example 7 of the present invention (blurring process example $7_B$).

FIGS. 23A and 23B are diagrams illustrating a mask filter and a corrected blurring filter generated at a position by the blurring process unit in Example 7 of the present invention (blurring process example $7_B$).

FIGS. 24A and 24B are diagrams illustrating the mask filter and the corrected blurring filter generated at another position by the blurring process unit in Example 7 of the present invention (blurring process example $7_B$).

FIGS. 26A and 26B are diagrams illustrating the mask filter and the corrected blurring filter generated at a position by the blurring process unit in Example 7 of the present invention (blurring process example $7_C$).

DETAILED DESCRIPTION OF THE PREFERRED EMBODIMENTS

Figure 1:
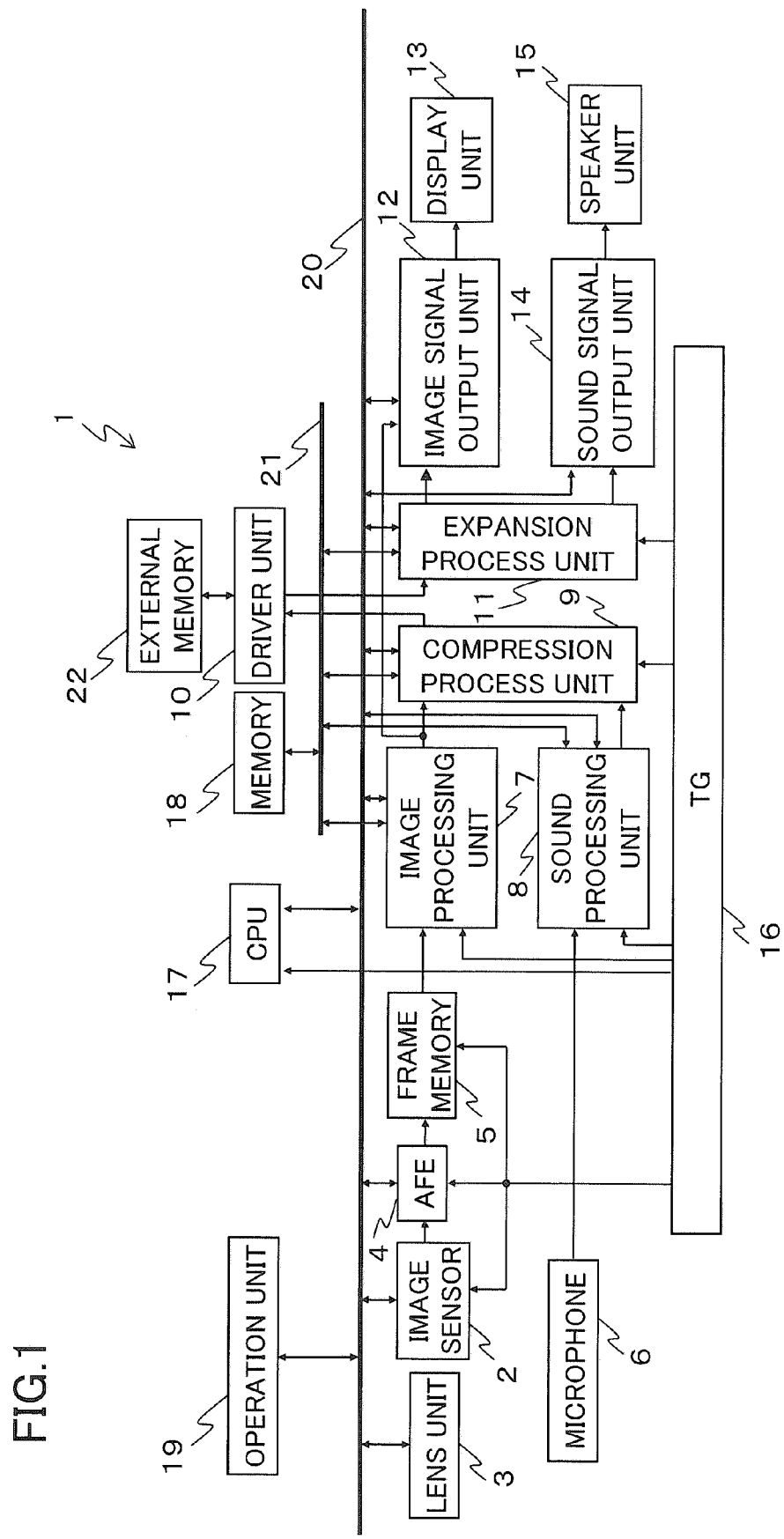
FIG. 1 is a general structure diagram of an image sensing apparatus according to an embodiment of the present invention.

An embodiment of the present invention, in which an image processing of the same is embodied in an image sensing apparatus such as a digital still camera or a digital video camera, will be described with reference to the attached drawings. In the drawings, the same parts are denoted by the same symbol or numeral, and overlapping description of the same part is omitted as a rule. The image sensing apparatus may be one that can take a moving image as long as it can take a still image. Note that "to image" and "to take image" have the same meaning in this specification.

[Structure of Image Sensing Apparatus]

FIG. 1 is a block diagram illustrating an internal structure of an image sensing apparatus 1 according to an embodiment of the present invention. In FIG. 1, the image sensing apparatus 1 includes an image sensor (solid state image sensor) 2 such as a charge coupled device (CCD) or a complementary metal oxide semiconductor (CMOS) sensor which converts incident light into electric signal, a lens unit 3 which includes a zoom lens and a focus lens so as to form an optical image of a subject on the image sensor 2, an analog front end (AFE) 4 including an amplifier circuit (not shown) which amplifies an image signal that is an analog electric signal output from the image sensor 2 and an analog to digital (A/D) conversion circuit (not shown) which converts an analog image signal into a digital image signal, a frame memory 5 which temporarily stores the digital image signal of a plurality of frames output from the AFE 4 by frame, a microphone 6 which converts a sound signal supplied externally into an electric signal, an image processing unit 7 which performs an image processing on an image signal stored temporarily in the frame memory 5, a sound processing unit 8 which converts the analog sound signal from the microphone 6 into a digital sound signal and performs a sound processing on the obtained digital sound signal, and a compression process unit 9 which performs a compression coding process on an image signal from the image processing unit 7 and a sound signal from the sound processing unit 8. When the image sensing apparatus 1 takes a still image, the compression process unit 9 can perform the compression coding process on the image signal from the image processing unit 7 using a JPEG (Joint Photographic Experts Group) compression method or the like. When the image sensing apparatus 1 takes a moving image, the compression process unit 9 can perform the compression coding process on the image signal from the image processing unit 7 and the sound signal from the sound processing unit 8 using a MPEG (Moving Picture Experts Group) compression method or the like.

In addition, the image sensing apparatus 1 includes a driver unit 10 which records a compression coded signal that is compression-coded by the compression process unit 9 in an external memory 22 such as a SD (Secure Digital) card or the like, an expansion process unit 11 which expands and decodes the compression coded signal read from the external memory 22 by the driver unit 10, an image signal output unit 12 which converts the image signal obtained by decoding by the expansion process unit 11 into an analog image signal, a display unit 13 including a liquid crystal display (LCD) or the like which display an image based on an image signal obtained by the conversion by the image signal output unit 12, a sound signal output unit 14 which converts the digital sound signal from the expansion process unit 11 into an analog sound signal and outputs the analog sound signal, and a speaker unit 15 which reproduces the analog sound signal from the sound signal output unit 14.

In addition, the image sensing apparatus 1 includes a timing generator (TG) 16 which outputs a timing control signal for synchronizing action timings of individual blocks in the image sensing apparatus 1, a central processing unit (CPU) 17 which controls a driving action of the entire image sensing apparatus 1, a memory 18 which stores each program for each action and temporarily stores data when the program is executed, and an operation unit 19 including a shutter button for taking a still image, or the like, which receives an instruction input from a user, a bus 20 for data communication between the CPU 17 and individual blocks in the image sensing apparatus 1, and a bus 21 for data communication between the memory 18 and individual blocks in the image sensing apparatus 1.56

Figure 2:
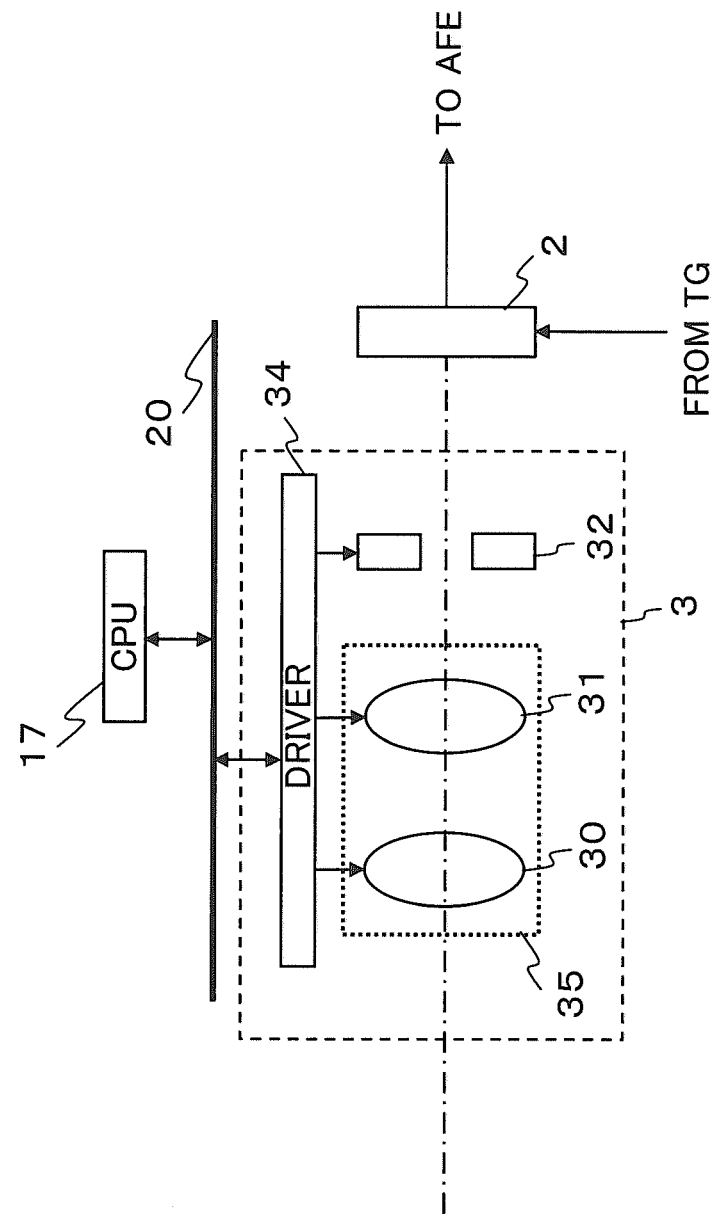
FIG. 2 is an internal structure diagram of a lens unit illustrated in FIG. 1.

FIG. 2 is an internal structure diagram of the lens unit 3. The lens unit 3 includes an optical system 35 constituted of a plurality of lenses including as a zoom lens 30 and a focus lens 31, an aperture stop 32, and a driver 34. The driver 34 is constituted of motors or the like for moving the zoom lens 30 and the focus lens 31, and for adjusting an opening amount (i.e., a size of the opening) of the aperture stop 32.

The image sensing apparatus 1 has a function of automatically controlling a position of the focus lens 31 so as to form an optical image of the subject on an imaging surface of the image sensor 2, namely, an automatic focus (AF) function. The imaging surface can also be called a light receiving surface. By the AF function, the point at which the optical image of a subject is formed is ideally identical to a point on the imaging surface of the image sensor 2. In this embodiment, to form an optical image of a subject on the imaging surface of the image sensor 2 is expressed as "to focus on the subject". In addition, a subject that is in focus is expressed as a "focused subject". In addition, an out-of-focus state is expressed as an "unfocused state".

In addition, the image sensing apparatus 1 has a function of automatically controlling an opening amount of the aperture stop 32, an exposure time of the image sensor 2, and an amplification factor of the AFE 4, so as to maintain substantially constant brightness of taken images, and this function is called an automatic exposure (AE) function. Further, the image sensing apparatus 1 also has a function of deciding a light source of light that irradiates the subject so as to determine a hue of white color automatically in accordance with the light source and to determine hues of colors other than the white color in accordance with the hue of white color. This function is called an automatic white balance (AWB) function.

In the image sensing apparatus 1, when a photographer performs an operation of changing a zoom magnification using the operation unit 19, the CPU 17 performs so-called zoom control of moving the zoom lens 30 along the optical axis in accordance with this operation. Thus, an angle of view of imaging by the image sensor 2 is changed (in other words, a subject image formed on the imaging surface of the image sensor 2 is enlarged or reduced).

In any image, a focused subject is also called a specified subject, and an unfocused subject is also called a background. When taking a still image, the image sensing apparatus 1 illustrated in FIG. 1 can relatively easily generate a taken image in which an image part of the specified subject is emphasized more than an image part of the background (hereinafter referred to also as an emphasized image) by image processing in the image processing unit 7. Hereinafter, Examples of an emphasized image generation process realized by the image processing unit 7 are described.

EXAMPLE 1

Figure 3B:
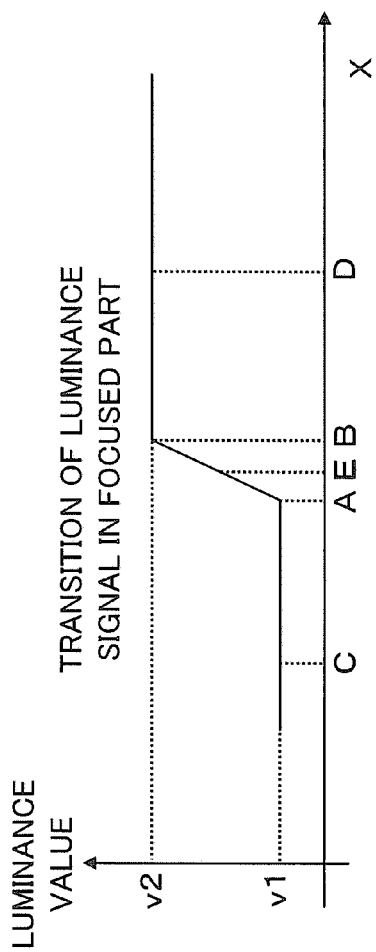
FIGS. 3A to 3C are diagrams illustrating an outline of an emphasized image generation process according to Example 1 of the present invention.
Figure 3C:
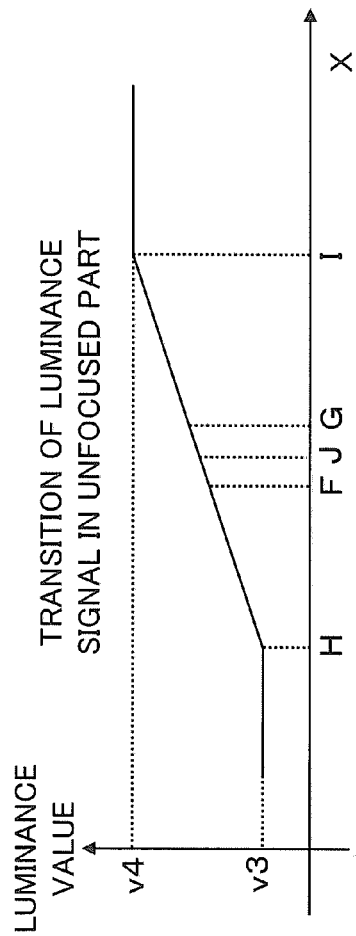
Figure 3A:
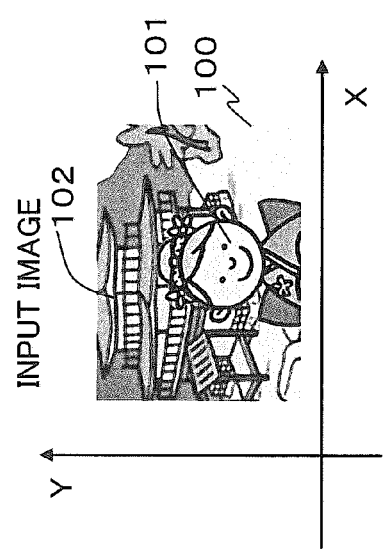

Example 1 will be described. FIGS. 3A to 3C are diagrams illustrating an outline of the emphasized image generation process according to Example 1. FIG. 3A illustrates an input image 100 obtained by photographing a person 101 and a building 102 as a still image using the image sensing apparatus 1. In the input image 100, the person 101 corresponds to the specified subject, and the building 102 corresponds to one of the backgrounds. In other words, the input image 100 includes an image of the person 101 as a specified subject image and an image of the building 102 as a background image. In any two-dimensional image such as the input image 100, an axis in the horizontal direction and an axis in the vertical direction are referred to as an X axis and a Y axis, respectively.

As to the input image 100, a manner in which a luminance signal changes along the X axis direction in the image area where the person 101 exists is illustrated in FIG. 3B. In the input image 100, the image area where the person 101 exists is a focused part that is in focus. Since the person 101 is in focus in the input image 100, a luminance value is changed quickly at the vicinity of point E that is a boundary part of luminance change (hereinafter referred to also as an edge part). The luminance value means a value of the luminance signal and has the same meaning as a signal level of the luminance signal (i.e., Y signal). Concerning a certain pixel, luminance of the pixel increases as the luminance value increases. The luminance value may be referred to simply as luminance.

When a noted pixel exists at the point E in the focused part, an area between point A and point B with respect to the point E as its center can be defined as an extreme local area, and an area between point C and point D with respect to the point E as its center that is larger than the extreme local area can be defined as a local area. In this case, a difference between the maximum value and the minimum value of luminance in the extreme local area (hereinafter referred to as a luminance difference value in the extreme local area) is substantially the same as a difference between the maximum value and the minimum value of luminance in the local area (hereinafter referred to as a luminance difference value in the local area). In other words, in the focused part, the following equation is satisfied.

(luminance difference value in extreme local area)/
(luminance difference value in local area)≈1

In other words, in the focused part, a ratio of the luminance difference value in the extreme local area to the luminance difference value in the local area is substantially one.

On the other hand, as to the input image 100, a manner in which the luminance signal changes along the X axis direction in the image area where the building 102 exists is illustrated in FIG. 3C. In the input image 100, the image area where the building 102 exists is an unfocused part that is not in focus. In the input image 100, since the building 102 is not in focus, a luminance value is changed gradually at the vicinity of point J that is a boundary part of luminance change. When a noted pixel exists at the point J in the unfocused part, an area between point F and point G with respect to the point J as its center can be defined as an extreme local area, and an area between point H and point I with respect to the point J as its center that is larger than the extreme local area can be defined as a local area. In this case, a luminance difference value in the extreme local area is much smaller than a luminance difference value in the local area. In other words, in the unfocused part, the following equation is satisfied.

(luminance difference value in extreme local area)/
(luminance difference value in local area)<<1

In other words, in the unfocused part, a ratio of the luminance difference value in the extreme local area to the luminance difference value in the local area is sufficiently smaller than one.

Further, in the following description, (luminance difference value in extreme local area)/(luminance difference value in local area), namely the ratio of the luminance difference value in the extreme local area to the luminance difference value in the local area is referred to as an edge difference ratio.

In this way, a transition pattern of the luminance signal in the edge part is different between a part that is in focus (i.e., focused part) and a part that is not in focus (i.e., unfocused part) in the input image. Therefore, the edge difference ratio is different between the focused part and the unfocused part. In other words, in each pixel of the input image, the transition pattern of the luminance signal around the pixel is different depending on the corresponding focus degree, and therefore the corresponding edge difference ratio is also different. The focus degree means an index indicating a degree to which the focus is adjusted.

Figure 4:
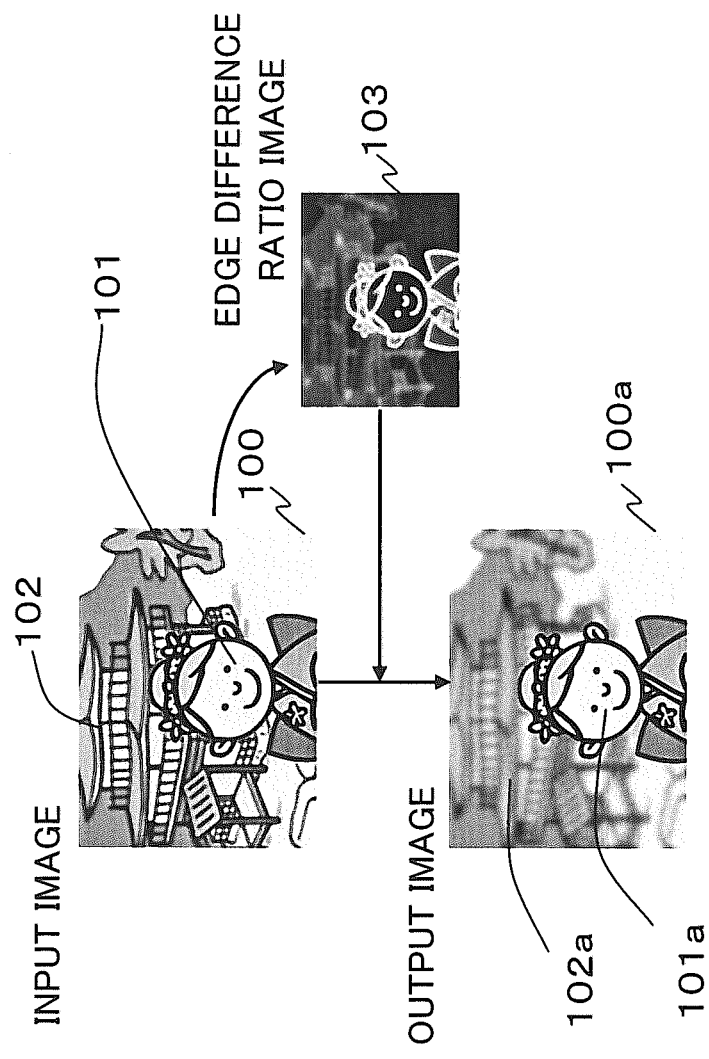
FIG. 4 is a diagram illustrating an outline of an emphasized image generation process according to Example 1 of the present invention.

In Example 1, when the blurring process is performed on the input image so as to generate an output image, a blurring degree in the blurring process is changed in accordance with the edge difference ratio. FIG. 4 is a diagram illustrating an output image generated by the blurring process on the input image. An edge difference ratio image 103 is an image generated by calculating the edge difference ratio for each pixel of the input image 100 so as to plot the result. An output image 100a is an image generated by performing the blurring process on the input image 100 with the blurring degree corresponding to the edge difference ratio. Numerals 101a and 102a denote the person 101 and the building 102 on the output image 100a.

By setting the blurring degree to be larger as the edge difference ratio is smaller, the blurring process is performed with a large blurring degree on the unfocused building 102. On the contrary, the blurring process is not performed or is performed with a small blurring degree on the focused person 101. Therefore, in the output image 100a, the blurring degree becomes larger in the background image including the unfocused building 102a than in the input image 100. As a result, a taken image with so-called "bokeh" can be obtained as the output image 100a.

Figure 5:
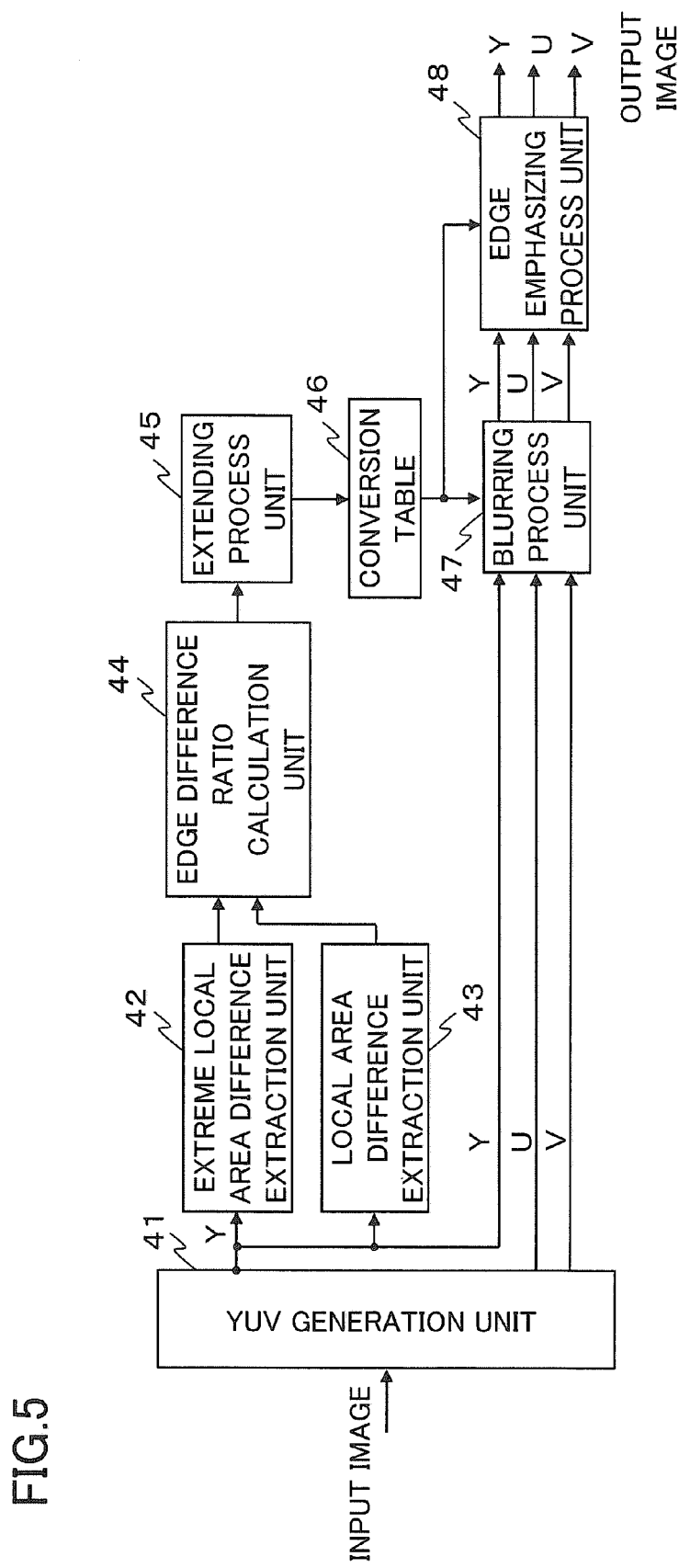
FIG. 5 is a diagram illustrating an action of the emphasized image generation process according to Example 1 of the present invention.

FIG. 5 is a diagram illustrating an action of the emphasized image generation process according to Example 1. Individual portions illustrated in FIG. 5 can be disposed in the image processing unit 7 illustrated in FIG. 1. As described above, the frame memory 5 temporarily stores the digital image signal output from the AFE 4. This digital image signal is stored in the form of RAW data. A YUV generation unit 41 performs a so-called color separation process (also referred to as a demosaicing process or a color synchronization process) on the image signal of the RAW data format stored temporarily in the frame memory 5, and generates a Y signal that is the luminance signal, and U and V signal that are color difference signals from the digital image signal after the color separation.

An extreme local area difference extraction unit 42 extracts and outputs a luminance difference value of the extreme local area for each pixel of the input image from the luminance signal output from the YUV generation unit 41. A local area difference extraction unit 43 extracts and outputs a luminance difference value of the local area for each pixel of the input image from the luminance signal output from the YUV generation unit 41. An edge difference ratio calculation unit 44 calculates and outputs the edge difference ratio for each pixel of the input image on the basis of the luminance difference value of the extreme local area and the luminance difference value of the local area.

Figure 6:
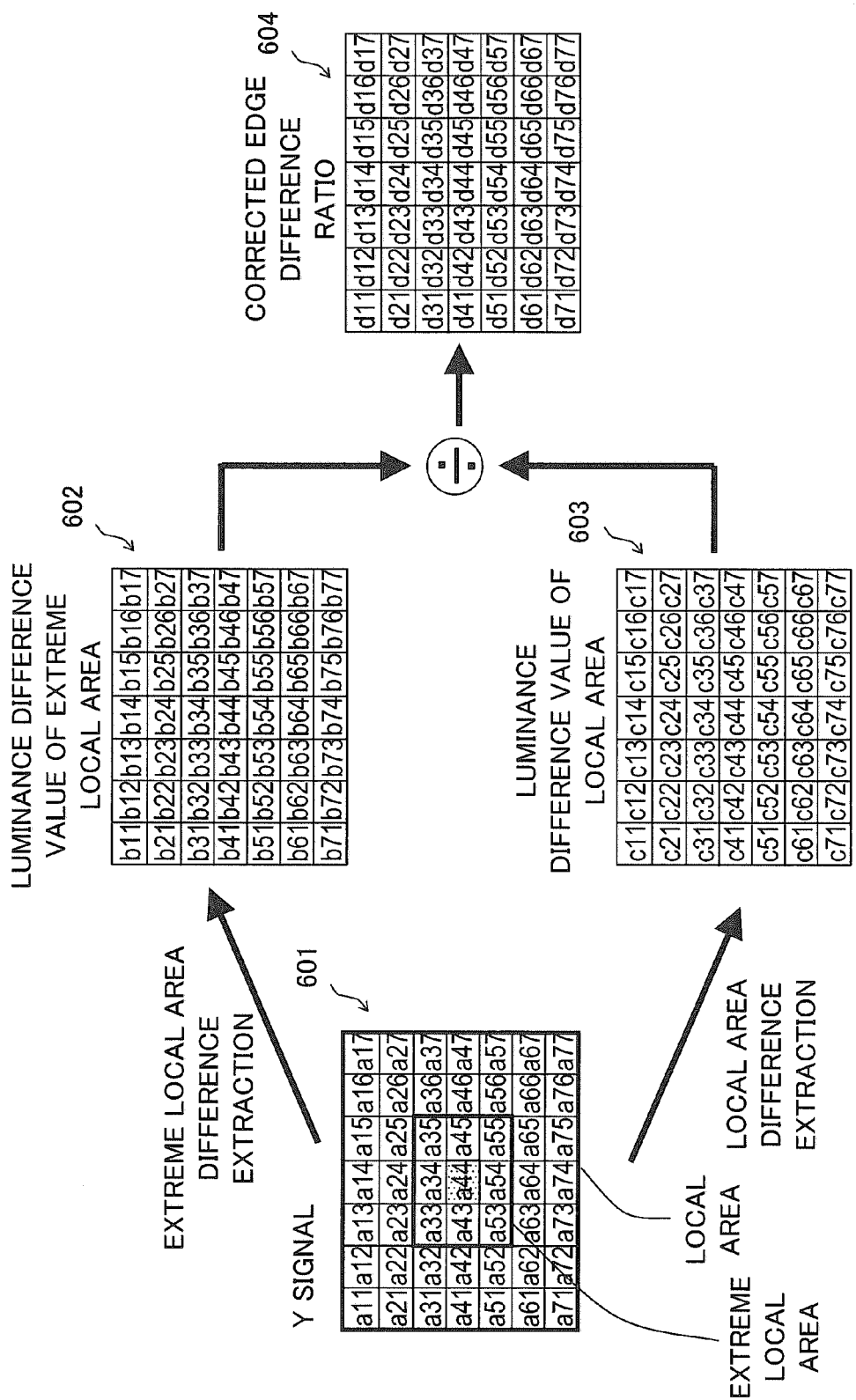
FIG. 6 is a diagram illustrating an extreme local area difference extraction process, a local area difference extraction process, and an edge difference ratio calculation process according to Example 1 of the present invention.

FIG. 6 is a diagram illustrating an extreme local area difference extraction process by the extreme local area difference extraction unit 42, a local area difference extraction process by the local area difference extraction unit 43, and an edge difference ratio calculation process by the edge difference ratio calculation unit 44. A matrix table 601 illustrated in FIG. 6 is a diagram obtained by extracting 7×7 pixels as an example from the luminance signal output from the YUV generation unit 41. In the matrix table 601 illustrated in FIG. 6, "aij" indicates a luminance value of pixel Pij of the input image (i and j denote integers). For instance, "a12" indicates a luminance value of pixel P12. Pixels Pi1 to Pi7 are seven pixels arranged continuously in the horizontal direction, and pixels P1j to P7j are seven pixels arranged continuously in the vertical direction. Here, the extreme local area is defined to be an image area with respect to the noted pixel as its center having a relatively small range from the noted pixel. Further, the local area is defined to be an image area with respect to the noted pixel as its center having a larger range than the extreme local area. In other words, a relatively small image area with respect to the noted pixel as its center is referred to as the extreme local area, and an image area with respect to the noted pixel as its center having a larger range than the extreme local area is referred to as the local area.

In the matrix table 601 illustrated in FIG. 6, for example, an area having 3×3 pixels is defined as the extreme local area, and an area having 7×7 pixels is defined as the local area. Specifically, pixel P44 is set as the noted pixel, the area including pixels Pij (i=3, 4, 5, and j=3, 4, 5) is defined as the extreme local area, and the area including pixels Pij (i=1, 2, ... 7, j=1, 2, ... 7) is defined as the local area.

The extreme local area difference extraction unit 42 extracts a difference between the maximum value and the minimum value of luminance in the extreme local area of the noted pixel as the luminance difference value of the extreme local area. With reference to the matrix table 601 illustrated in FIG. 6, for example, it is supposed that a55 is the maximum value of luminance, and that a33 is the minimum value of luminance in the extreme local area of the noted pixel P44. Then, the luminance difference value b44 of the extreme local area of the noted pixel P44 satisfies b44=a55-a33. The extreme local area difference extraction unit 42 shifts the extreme local area by one pixel unit (in other words, shifts the noted pixel by one pixel unit), and extracts the luminance difference value of the extreme local area in each shift. Thus, the luminance difference value of the extreme local area is extracted for every pixel.

A matrix table 602 illustrated in FIG. 6 indicates the luminance difference value of the extreme local area of each pixel. For instance, b44 indicates the luminance difference value of the extreme local area of the pixel P44.

The local area difference extraction unit 43 extracts a difference between the maximum value and the minimum value of luminance in the local area of the noted pixel as the luminance difference value of the local area. With reference to the matrix table 601 illustrated in FIG. 6, for example, it is supposed that all is the maximum value of luminance, and a17 is the minimum value of luminance in the local area of the noted pixel P44. Then, the luminance difference value c44 of the local area of the noted pixel P44 is c44=a11-a17. The local area difference extraction unit 43 shifts the local area by one pixel unit (in other words, shifts the noted pixel by one pixel unit), and extracts the luminance difference value of the local area in each shift. Thus, the luminance difference value of the local area is extracted for every pixel. A matrix table 603 illustrated in FIG. 6 indicates the luminance difference value of the local area of each pixel. For instance, c44 indicates the luminance difference value of the local area of the pixel P44.

When the luminance difference value of the extreme local area and the luminance difference value of the local area are denoted by $YD_A$ and $YD_B$, respectively, the edge difference ratio calculation unit 44 illustrated in FIG. 5 calculates a ratio of the value $YD_A$ to the value $(YD_B+\alpha)$ for each pixel. In other words, a ratio "$YD_A/(YD_B+\alpha)$" is calculated for each pixel. Here, the calculated ratio "$YD_A/(YD_B+\alpha)$" is referred to as a corrected edge difference ratio. A value a is a minute offset value, and $\alpha>0$ holds. Note that the offset value a is added to the luminance difference value of the local area $YD_B$ in order to prevent the denominator of the expression for calculating the corrected edge difference ratio from being zero. A matrix table 604 illustrated in FIG. 6 indicates a corrected edge difference ratio of each pixel. For instance, d44 indicates a corrected edge difference ratio of the pixel P44.

Figure 7A:
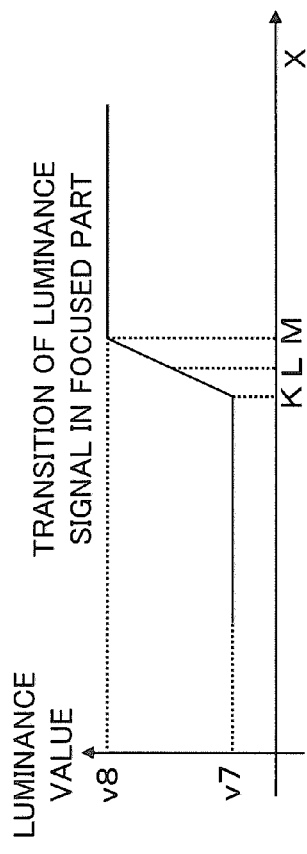
FIGS. 7A to 7C are diagrams illustrating an extending process according to Example 1 of the present invention.
Figure 7B:
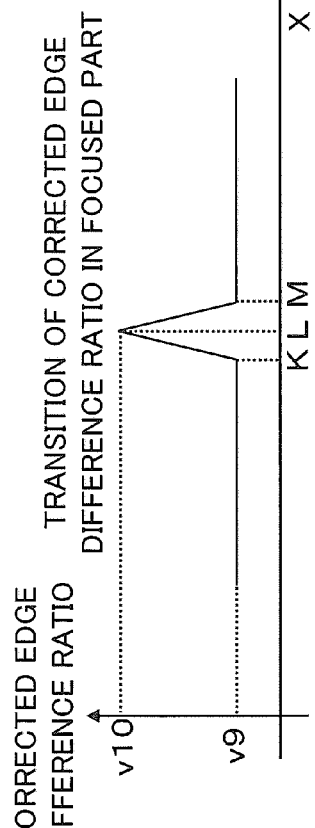
Figure 7C:
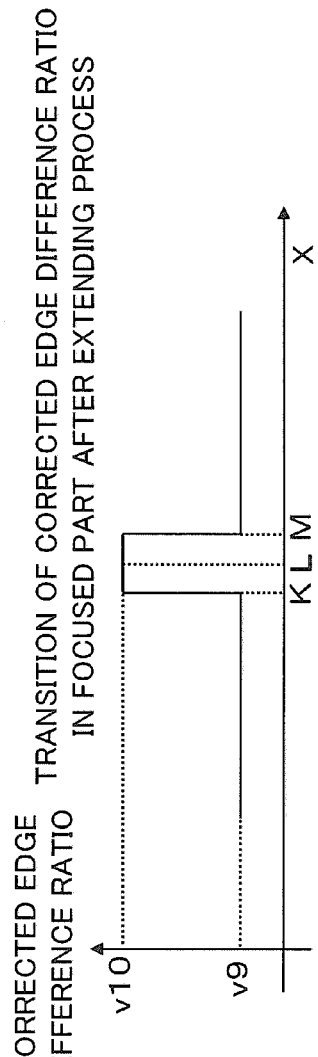

An extending process unit 45 illustrated in FIG. 5 extends an area of the edge part on the basis of the calculated corrected edge difference ratio of each pixel. FIGS. 7A to 7C are diagrams illustrating an outline of the extending process performed by the extending process unit 45. FIG. 7A is a schematic diagram illustrating a transition of the luminance signal along the X axis direction in the image area where the person 101 exists in the input image 100 (see also FIG. 3A). In FIG. 7A, the point L is the edge part, and an area between point K and point M that is a predetermined area with respect to point L as its center is set to a target area of the extending process. Luminance values of the point K and the point M are v7 and v8, respectively (v8>v7).

FIG. 7B is a schematic diagram illustrating a transition of the corrected edge difference ratio along the X axis direction in the image area corresponding to FIG. 7A. In FIG. 7B, the corrected edge difference ratios of the points K and M are v9 each, and the corrected edge difference ratio of the point L is v10 (v10>v9). As apparent from FIG. 7B, the corrected edge difference ratio that is calculated by the edge difference ratio calculation unit 44 becomes largest at the point L as the edge part. The extending process unit 45 replaces the corrected edge difference ratio of each pixel in the target area of the extending process with the corrected edge difference ratio of the point L having the maximum value.

FIG. 7C is a schematic diagram illustrating a transition of the corrected edge difference ratio after the extending process along the X axis direction in the image area corresponding to FIG. 7A. In FIG. 7C, the corrected edge difference ratio in the target area of the extending process is replaced with the corrected edge difference ratio of the point L. As a result of this replacement, the corrected edge difference ratio of every pixel in the target area of the extending process including the points K and M becomes v10. In other words, in the target area of the extending process with respect to the noted pixel as its center, the extending process unit 45 replaces the corrected edge difference ratio of the noted pixel with the largest corrected edge difference ratio in the target area of the extending process.

FIG. 8 is a diagram illustrating the extending process performed by the extending process unit 45. Each of matrix tables 611, 612, 613, and 614 illustrated in FIG. 8 indicates corrected edge difference ratios of 7×7 pixels among corrected edge difference ratios of the input image supplied from the edge difference ratio calculation unit 44. In the matrix table 611 illustrated in FIG. 8, the extending process unit 45 sets the pixel P44 to the noted pixel and sets the image area including 3×3 pixels with respect to the noted pixel P44 as its center to the target area of the extending process. Here, in the matrix table 611 illustrated in FIG. 8, it is supposed that the corrected edge difference ratio d44 of the noted pixel P44 is the largest corrected edge difference ratio among the corrected edge difference ratios of all pixels in the target area of the extending process. Then, the extending process unit 45 maintains the corrected edge difference ratio of the noted pixel P44 without replacing it with other corrected edge difference ratio. A matrix table 615 illustrated in FIG. 8 indicates a result of performing the extending process in the state where the pixel P44 is set to the noted pixel. When the noted pixel and the target area of the extending process are shifted to the right by one pixel from the state where the pixel P44 is the noted pixel, the pixel P45 is set to the noted pixel. The matrix table 612 illustrated in FIG. 8 corresponds to the state where the pixel P45 is set to the noted pixel.

In the matrix table 612 illustrated in FIG. 8, it is supposed that the corrected edge difference ratio d44 is the largest corrected edge difference ratio among the corrected edge difference ratios of all pixels in the target area of the extending process. Then, the extending process unit 45 replaces the corrected edge difference ratio of the noted pixel P45 with a value of d44. A matrix table 616 illustrated in FIG. 8 indicates a result of performing the extending process in the state where the pixels P44 and P45 are set in turn to the noted pixel. In the matrix table 616 illustrated in FIG. 8, the corrected edge difference ratio of the pixel P45 is replaced and changed from d45 to d44. When the noted pixel and the target area of the extending process are shifted upward by one pixel from the state where the pixel P44 is the noted pixel, the pixel P34 is set to the noted pixel. The matrix table 613 illustrated in FIG. 8 corresponds to the state where the pixel P34 is set to the noted pixel.

Also in the matrix table 613 illustrated in FIG. 8, it is supposed that the corrected edge difference ratio d44 is the largest corrected edge difference ratio among the corrected edge difference ratios of all pixels in the target area of the extending process. Then, the extending process unit 45 replaces the corrected edge difference ratio of the noted pixel P34 with a value of d44. A matrix table 617 illustrated in FIG. 8 indicates a result of performing the extending process in the state where the pixels P44, P45, and P34 are set in turn to the noted pixel. In the matrix table 617 illustrated in FIG. 8, the corrected edge difference ratio of the pixel P34 is replaced and changed from d34 to d44. When the noted pixel and the target area of the extending process are shifted downward by one pixel from the state where the pixel P44 is the noted pixel, the pixel P54 is set to the noted pixel. The matrix table 614 illustrated in FIG. 8 corresponds to the state where the pixel P54 is set to the noted pixel.

Also in the matrix table 614 illustrated in FIG. 8, it is supposed that the corrected edge difference ratio d44 is the largest corrected edge difference ratio among the corrected edge difference ratios of all pixels in the target area of the extending process. Then, the extending process unit 45 replaces the corrected edge difference ratio of the noted pixel P54 with a value of d44. A matrix table 618 illustrated in FIG. 8 indicates a result of performing the extending process in the state where the pixel P44, P45, P34, and P54 are set in turn to the noted pixel. In the matrix table 618 illustrated in FIG. 8, the corrected edge difference ratio of the pixel P54 is replaced and changed from d54 to d44.

In this way, the extending process unit 45 performs the extending process for every pixel. Since the edge part area is extended by the extending process, the boundary between the focused subject and the unfocused subject becomes clear, so that an emphasized image with more "bokeh" can be generated. The extending process unit 45 outputs the corrected edge difference ratio after the extending process.

A conversion table 46 illustrated in FIG. 5 derives a blurring degree and an edge emphasizing degree for each pixel in accordance with the corrected edge difference ratio of each pixel output from the extending process unit 45, and outputs the derived result.

Figure 9A:
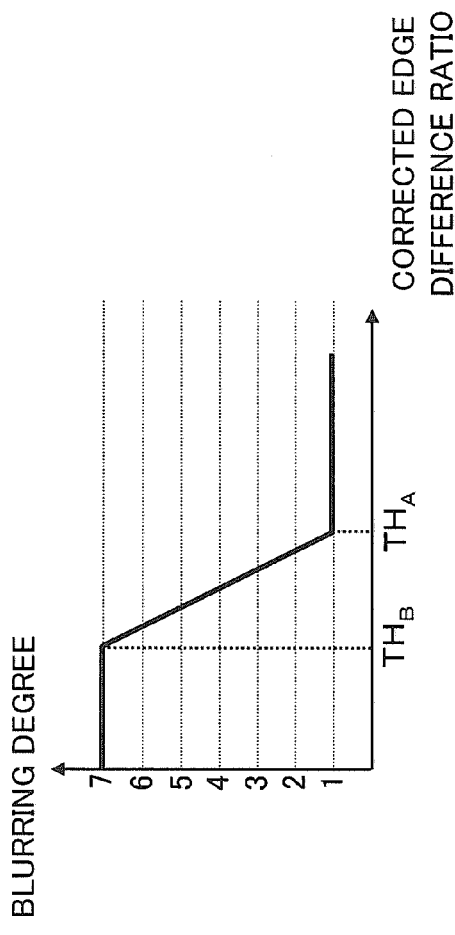
FIGS. 9A and 9B are diagrams illustrating a blurring process and an edge emphasizing process according to Example 1 of the present invention.

FIG. 9A illustrates a function for the conversion table 46 to derive the blurring degree from the corrected edge difference ratio. As illustrated in FIG. 9A, the blurring degree derived by the conversion table 46 becomes largest (7 in the example illustrated in FIG. 9A) when the corresponding corrected edge difference ratio is smaller than a threshold value $TH_B$, and becomes smallest (1 in the example illustrated in FIG. 9A) when the corresponding corrected edge difference ratio is a threshold value $TH_A$ or larger. Here, $TH_B<TH_A$ is satisfied.

When the corrected edge difference ratio is the threshold value $TH_B$ or larger, and smaller than the threshold value $TH_A$, the blurring degree is decreased linearly as the corrected edge difference ratio increases. Further, in this case, it is possible to decrease the blurring degree nonlinearly as the corrected edge difference ratio increases, but is desirable that the blurring degree is decreased monotonously when the corrected edge difference ratio increases.

Figure 9B:
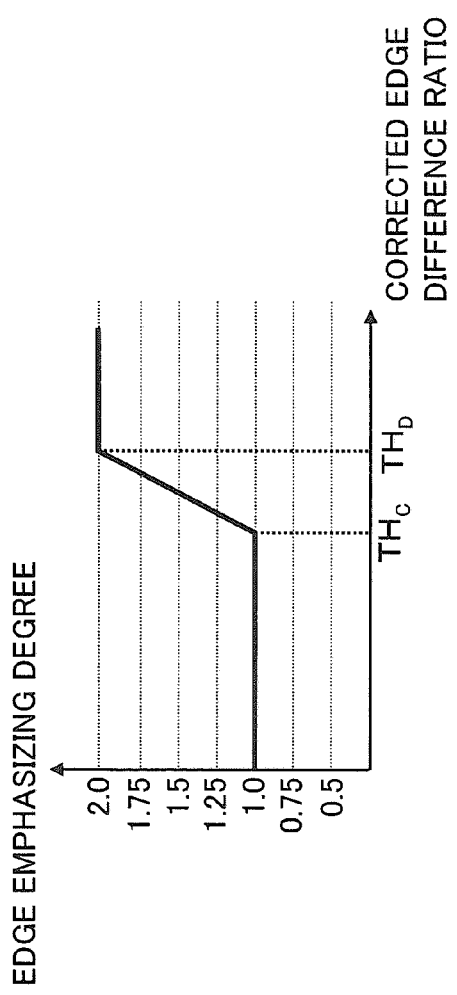

FIG. 9B illustrates a function for the conversion table 46 to derive the edge emphasizing degree from the corrected edge difference ratio. As illustrated in FIG. 9B, the edge emphasizing degree derived by the conversion table 46 becomes smallest (1.0 in the example illustrated in FIG. 9B) when the corresponding corrected edge difference ratio is smaller than a threshold value $TH_C$, and becomes largest (2.0 in the example illustrated in FIG. 9B) when the corresponding corrected edge difference ratio is a threshold value $TH_D$ or larger. Here, $TH_C<TH_D$ is satisfied. When the corrected edge difference ratio is the threshold value $TH_C$ or larger, and smaller than the threshold value $TH_D$, the edge emphasizing degree is increased linearly as the corrected edge difference ratio increases. Further, in this case, it is possible to increase the edge emphasizing degree nonlinearly as the corrected edge difference ratio increases, but is desirable that the edge emphasizing degree is increased monotonously when the corrected edge difference ratio increases.

A blurring process unit 47 illustrated in FIG. 5 performs the blurring process for each pixel on the Y, U, and V signals output from the YUV generation unit 41 in accordance with the blurring degree of each pixel output from the conversion table 46. In the blurring process unit 47, for example, instead of a simple averaging filter, a Gaussian filter can be adopted, in which a larger weight is assigned to a pixel closer to the noted pixel so that the weight has a distribution close to a Gaussian distribution. In this case, the blurring degree output from the conversion table 46 can be used as a variance of the Gaussian distribution. The Y, U, and V signals after the blurring process are output from the blurring process unit 47.

An edge emphasizing process unit 48 performs an edge emphasizing process for each pixel on the Y, U, and V signals output from the blurring process unit 47. For instance, in the edge emphasizing process unit 48, it is possible to use a sharpening filter, which can change the edge emphasizing degree (intensity of emphasizing the edge) in accordance with the edge emphasizing degree of each pixel output from the conversion table 46. Further, as the Gaussian filter and the sharpening filter described above, for example, it is possible to use those described in the document "Digital Image Processing" published by CG-ARTS Association on Mar. 1, 2007, second edition, pp. 108-110 and 122-124. In addition, in the above-mentioned example according to Example 1, the extreme local area is an area including 3×3 pixels, the local area is an area including 7×7 pixels, and the target area of the extending process is an area including 3×3 pixels. However, the sizes of the areas are not limited to those described in this case. It is possible to use a larger or a smaller area than the area adopted in Example 1 as the extreme local area, the local area, or the target area of the extending process.

EXAMPLE 2

Figure 10:
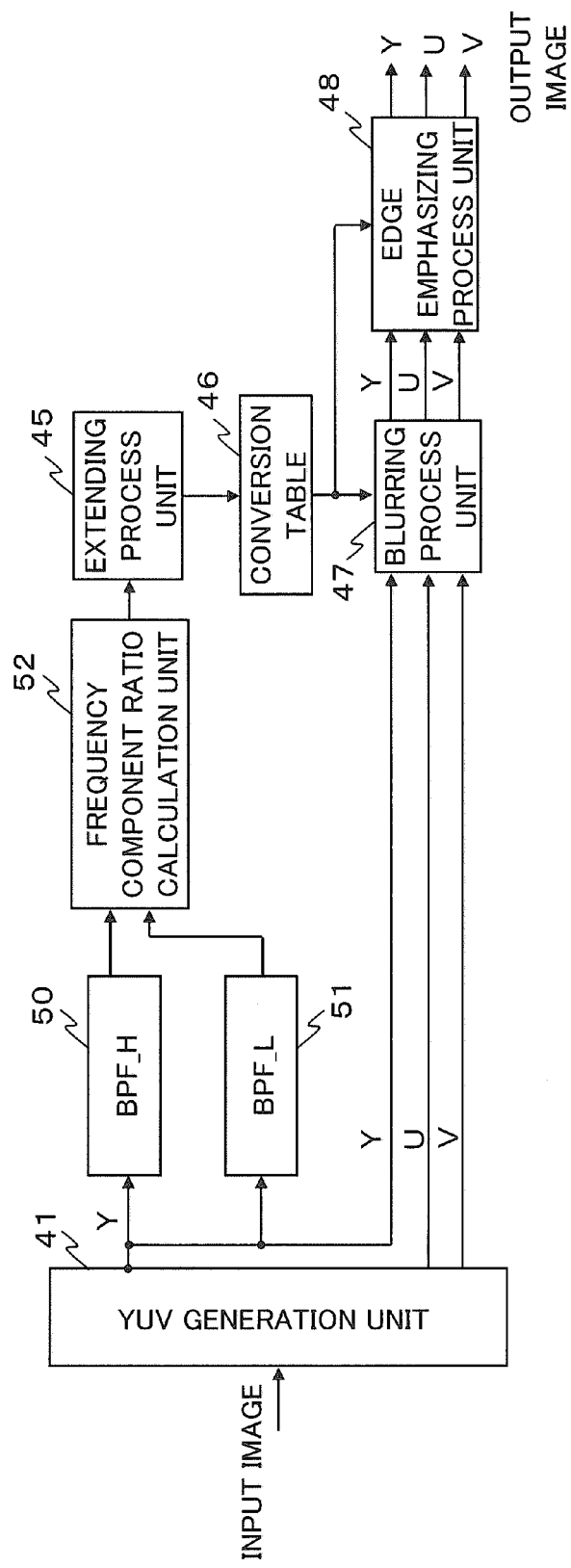
FIG. 10 is a diagram illustrating an action of the emphasized image generation process according to Example 2 of the present invention.

Example 2 will be described. FIG. 10 is a diagram illustrating Example 2 of the emphasized image generation process in the image processing unit 7. Individual portions illustrated in FIG. 10 may be disposed in the image processing unit 7. In FIG. 10, a part denoted by the same numeral as that in FIG. 5 is a part having the same function and action as the part of Example 1, and therefore descriptions of the function and the action are omitted. Note that the extending process unit 45 of Example 2 is supplied with a frequency component ratio that will be described later, and the extending process unit 45 performs the same process as the case of Example 1. Specifically, with respect to the corrected edge difference ratio determined for each pixel, by the same method as the extending process performed by the extending process unit 45 illustrated in FIG. 5, the extending process unit 45 illustrated in FIG. 10 performs the extending process on the frequency component ratio determined for each pixel so as to output the frequency component ratio after the extending process.

The conversion table 46 illustrated in FIG. 10 is supplied with the frequency component ratio of each pixel from the extending process unit 45, and the conversion table 46 performs the same process as the case of Example 1. Specifically, the conversion table 46 illustrated in FIG. 10 derives the blurring degree and the edge emphasizing degree for each pixel in accordance with the frequency component ratio of each pixel output from the extending process unit 45, and outputs the derived degrees. The method of determining the blurring degree and the edge emphasizing degree in accordance with the frequency component ratio is the same as the method of determining the blurring degree and the edge emphasizing degree in accordance with the corrected edge difference ratio described above in Example 1. Therefore, when FIGS. 9A and 9B are referred to in Example 2, the horizontal axis of each of the graphs illustrated in FIGS. 9A and 9B represents the frequency component ratio.

Each of BPF_H50 and BPF_L51 is a band pass filter that extracts the luminance signal containing components of frequency band of a predetermined range from the luminance signal output from the YUV generation unit 41. Note that the frequency described in this embodiment means a spatial frequency.

Figure 11:
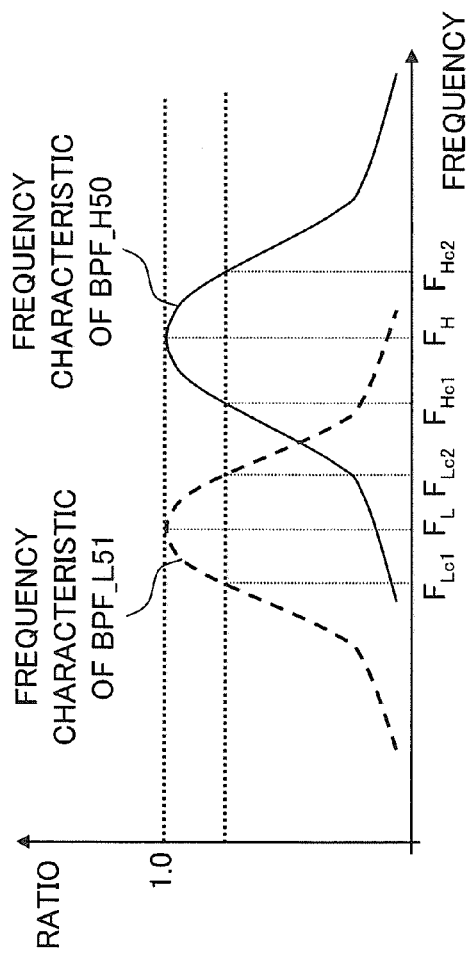
FIG. 11 is a diagram illustrating actions of band pass filters according to Example 2 of the present invention.

FIG. 11 illustrates frequency characteristics of the BPF_H50 and the BPF_L51. In FIG. 11, $F_H$ denotes a center frequency of the BPF_H50, and $F_{Hc1}$ and $F_{Hc2}$ denote cut-off frequencies of the BPF_H50. Here, $F_{Hc1}<F_H<F_{Hc2}$ is satisfied. The band from the cut-off frequency $F_{Hc1}$ on the low frequency side to the cut-off frequency $F_{Hc2}$ on the high frequency side is referred to as a passband of the BPF_H50. Similarly, $F_L$ denotes a center frequency of the BPF_L51, and $F_{Lc1}$ and $F_{Lc2}$ denote cut-off frequencies of the BPF_L51. Here, $F_{Lc1}<F_L<F_{Lc2}$ is satisfied. The band from the cut-off frequency $F_{Lc1}$ on the low frequency side to the cut-off frequency $F_{Lc2}$ on the high frequency side is a passband of the BPF_L51. The BPF_H50 transmits 100% of the luminance signal at the center frequency $F_H$, and the BPF_L51 transmits 100% of the luminance signal at the center frequency $F_L$. In any band pass filter, it can be interpreted that the center frequency is a center frequency of the passband of the band pass filter. Each of the BPF_H50 and the BPF_L51 performs the band pass filtering having the above-mentioned frequency characteristic on the luminance signal from the YUV generation unit 41 and outputs the luminance signal after the band pass filtering. The same is true for other band pass filters to which the luminance signal is supplied, which will be described later (H_BPF_H53 and the like illustrated in FIG. 12).

In the BPF_H50, the frequency $F_H$ is set to a relatively high frequency so that high frequency components in the luminance signal can be extracted. On the contrary, the frequency $F_L$ in the BPF_L51 is set to a frequency lower than the frequency $F_H$ so that lower frequency components can be extracted than by BPF_H50. A frequency component ratio calculation unit 52 calculates the frequency component ratio for each pixel in accordance with the following equation (1) on the basis of a luminance signal value output from the BPF_H50 and a luminance signal value output from the BPF_L51. In other words, when the luminance signal value output from the BPF_H50 and the luminance signal value output from the BPF_L51 are denoted by $OUT_{H50}$ and $OUT_{L51}$, respectively for the noted pixel, the frequency component ratio calculated for the noted pixel is $|OUT_{H50}/OUT_{L51}|$.

$$\text{frequency component ratio}=|(\text{output value of }BPF\_H50)/(\text{output value of }BPF\_L51)| \quad (1)$$

In the input image 100 illustrated in FIG. 3A, the area where the focused person 101 exists contains many luminance signals of high frequency components. On the contrary, since the image part of the unfocused building 102 is not in focus, it contains few luminance signals of high frequency components and many luminance signals of medium frequency or low frequency components.

Therefore, at the position in focus (i.e., at the focused position), the following expression is satisfied.

$|OUT_{H50}|>|OUT_{L51}|$

In contrast, at the position that is not in focus (i. ., at the unfocused position), the following expression is satisfied.

$|OUT_{H50}|<|OUT_{L51}|$

In Example 2, when the blurring process is performed on the input image so as to generate the output image, the blurring degree in the blurring process is changed in accordance with the frequency component ratio calculated by the above equation (1). Specifically, the blurring degree is changed in accordance with the frequency component ratio so that the blurring process with a smaller blurring degree is performed on a pixel having a larger frequency component ratio, and that the blurring process with a larger blurring degree is performed on a pixel having a smaller frequency component ratio. Thus, it is possible to generate an emphasized image in which a focused subject is emphasized.

EXAMPLE 3

Figure 12:
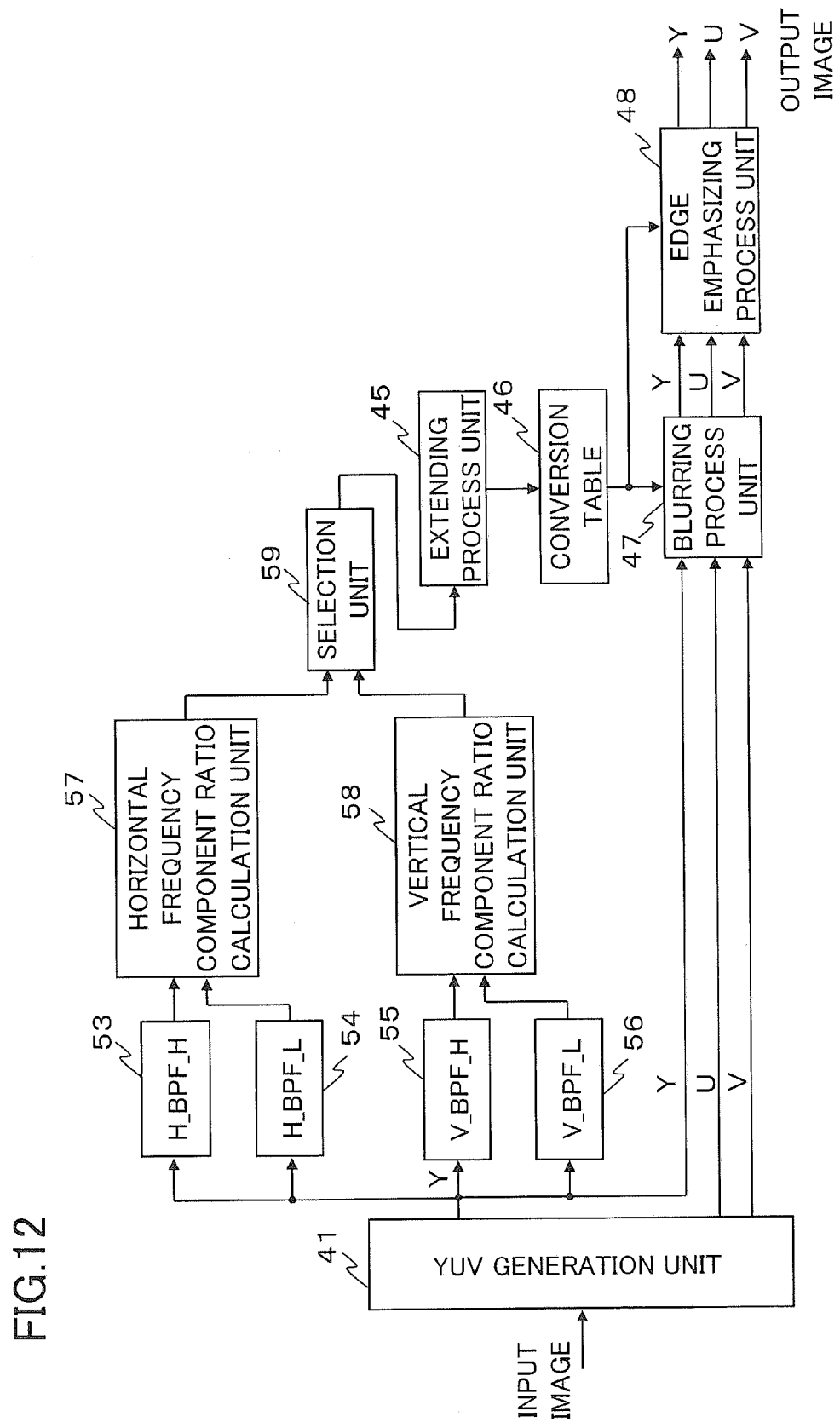
FIG. 12 is a diagram illustrating an action of the emphasized image generation process according to Example 3 of the present invention.

Example 3 will be described. FIG. 12 is a diagram illustrating Example 3 of the emphasized image generation process in the image processing unit 7. Individual portions illustrated in FIG. 12 may be disposed in the image processing unit 7. In FIG. 12, a part denoted by the same numeral as that in FIG. 10 is a part having the same function and action as the part of Example 2, and therefore descriptions of the function and the action are omitted. Further, in Example 3, the extending process unit 45 is supplied with a horizontal frequency component ratio or a vertical frequency component ratio that will be described later, and the extending process unit 45 performs the same process as the case of Example 2. Specifically, with respect to the frequency component ratio determined for each pixel, by the same method as the extending process performed by the extending process unit 45 illustrated in FIG. 10, the extending process unit 45 illustrated in FIG. 12 performs the extending process on the horizontal frequency component ratio or the vertical frequency component ratio of each pixel supplied from a selection unit 59, so as to output the horizontal frequency component ratio or the vertical frequency component ratio after the extending process. In addition, the conversion table 46 illustrated in FIG. 12 is supplied with the horizontal frequency component ratio or the vertical frequency component ratio of each pixel from the extending process unit 45, and the conversion table 46 illustrated in FIG. 12 performs the same process as that in the case of Example 2. In other words, the conversion table 46 illustrated in FIG. 12 derives the blurring degree and the edge emphasizing degree for each pixel in accordance with the horizontal frequency component ratio or the vertical frequency component ratio of each pixel output from the extending process unit 45, and outputs the derived result. The method of determining the blurring degree and the edge emphasizing degree in accordance with the horizontal frequency component ratio or the vertical frequency component ratio is the same as the method of determining the blurring degree and the edge emphasizing degree in accordance with the corrected edge difference ratio described above in Example 1. Therefore, when FIGS. 9A and 9B are referred to in Example 3, the horizontal axis of each of the graphs illustrated in FIGS. 9A and 9B represents the horizontal frequency component ratio or the vertical frequency component ratio.

Each of the H_BPF_H53 and H_BPF_L54 is a band pass filter which extracts a luminance signal containing a component of a frequency band in a predetermined range in the horizontal direction (X axis direction in FIG. 3A) from the luminance signal output from the YUV generation unit 41.

A center frequency $F_{HH}$ of the H_BPF_H53 is set to a relatively high frequency so that the H_BPF_H53 can extract high frequency components in the luminance signal. In contrast, a center frequency $F_{HL}$ of the H_BPF_L54 is set to a lower frequency than $F_{HH}$ so that the H_BPF_L54 can extract lower frequency components than the H_BPF_H53.

A horizontal frequency component ratio calculation unit 57 calculates the horizontal frequency component ratio in accordance with the following equation (2) on the basis of the luminance signal value output from the H_BPF_H53 and the luminance signal value output from the H_BPF_L54. In other words, when the luminance signal value output from the H_BPF_H53 and the luminance signal value output from the H_BPF_L54 for the noted pixel are denoted by $OUT_{H53}$ and $OUT_{L54}$, respectively, the horizontal frequency component ratio calculated for the noted pixel is $|OUT_{H53}/OUT_{L54}|$.

$$\text{horizontal frequency component ratio}=|(\text{output value of }H\_BPF\_H53)/(\text{output value of }H\_BPF\_L54)| \quad (2)$$

Each of V_BPF_H55 and V_BPF_L56 is a band pass filter that extracts the luminance signal containing components of a frequency band of a predetermined range in the vertical direction (Y axis direction in FIG. 3A) from the luminance signal output from the YUV generation unit 41.

A center frequency $F_{VH}$ of the V_BPF_H55 is set to a relatively high frequency so that the V_BPF_H55 can extract high frequency components in the luminance signal. In contrast, a center frequency $F_{VL}$ of the V_BPF_L56 is set to a lower frequency than $F_{VH}$ so that the V_BPF_L56 can extract lower frequency components than the V_BPF_H55.

A vertical frequency component ratio calculation unit 58 calculates the vertical frequency component ratio in accordance with the following equation (3) on the basis of the luminance signal value output from the V_BPF_H55 and the luminance signal value output from the V_BPF_L56. In other words, when the luminance signal value output from the V_BPF_H55 and the luminance signal value output from the V_BPF_L56 for the noted pixel are denoted by $OUT_{H55}$ and $OUT_{L56}$, respectively, the vertical frequency component ratio calculated for the noted pixel is $|OUT_{H55}/OUT_{L56}|$.

$$\text{vertical frequency component ratio}=|(\text{output value of }V\_BPF\_H55)/(\text{output value of }V\_BPF\_L56)| \quad (3)$$

The selection unit 59 selects a larger one of the horizontal frequency component ratio output from the horizontal frequency component ratio calculation unit 57 and the vertical frequency component ratio output from the vertical frequency component ratio calculation unit 58 so as to deliver the selected one to the extending process unit 45.

In this way, in Example 3, considering focus degrees in both the horizontal and the vertical directions of the input image, the blurring degree of the blurring process unit 47 and the edge emphasizing degree of the edge emphasizing process unit 48 can be controlled. Therefore, according to Example 3, it is possible to generate an emphasized image in which the blurring process and the edge emphasizing process are performed more delicately.

EXAMPLE 4

Figure 13:
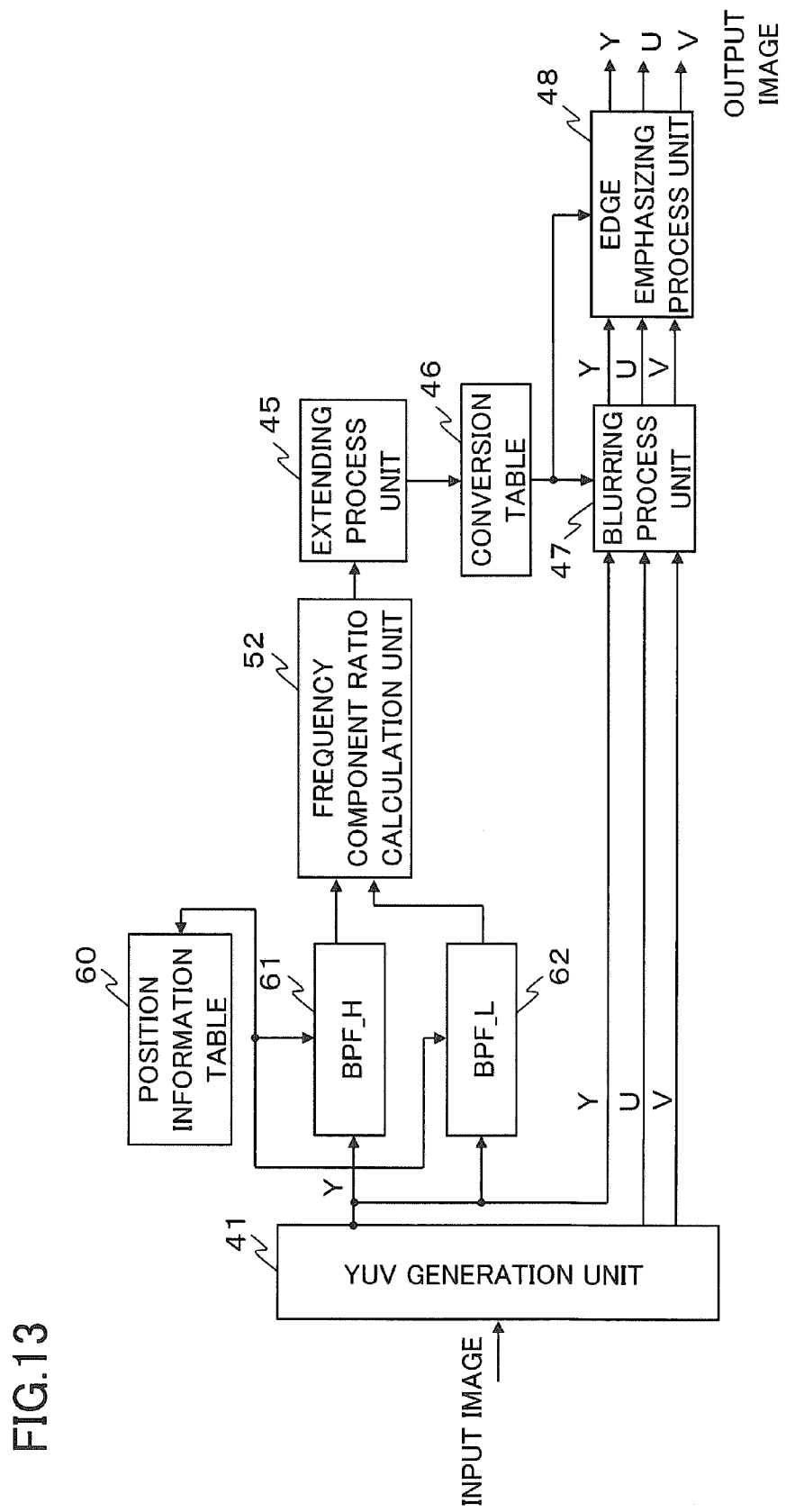
FIG. 13 is a diagram illustrating an action of the emphasized image generation process according to Example 4 of the present invention.

Example 4 will be described. FIG. 13 is a diagram illustrating Example 4 of the emphasized image generation process performed by the image processing unit 7. Individual portions illustrated in FIG. 13 may be disposed in the image processing unit 7. In FIG. 13, a part denoted by the same numeral as that in FIG. 10 is a part having the same function and action as the part of Example 2, and therefore descriptions of the function and the action are omitted.

In a lens included in the lens unit 3 of the image sensing apparatus 1, its modulation transfer function (MTF) is usually deteriorated as being far from the center of the taken image. Note that the center of the taken image means an intersection at which, in an example of the input image 100 illustrated in FIG. 3A, a straight line that is parallel to the Y axis and passes through the center in the X axis direction of the input image 100, and a straight line that is parallel to the X axis and passes through the center in the Y axis direction of the input image 100 cross each other. Therefore, for example, when the person 101 is in focus in the state where the person 101 is located at one of four corners far from the center of the taken image, a level of a high frequency component in the luminance signal of the person 101 is smaller than the case where the person 101 is located in the vicinity of the center and is in focus. Therefore, even if a BPF of a common characteristic is used for the entire taken image so as to calculate the frequency difference ratio from the above equation (1), it is difficult to obtain accurate characteristic (correct characteristic indicating the focus degree, in other words, correct characteristic indicating a shift from the focused position).

Therefore, as one method for improving accuracy of the characteristic of the frequency difference ratio, it is considered to change the characteristic of the BPF (center frequency) in accordance with a pixel position in the input image so as to increase accuracy of detecting the focus degree.

In FIG. 13, each of BPF_H61 and BPF_L62 is a band pass filter that extracts a luminance signal containing components of a frequency band of a constant range from the luminance signal output from the YUV generation unit 41. Further, each of the BPF_H61 and the BPF_L62 can change its center frequency in accordance with a parameter output from a position information table 60 that will be described later. Therefore, the range of the frequency band extracted from the luminance signal can be changed.

The position information table 60 stores a parameter in advance for setting ranges of the frequency bands to be extracted by the BPF_H61 and the BPF_L62. The ranges of the frequency bands to be extracted by the BPF_H61 and the BPF_L62 are determined in accordance with pixel positions of the luminance signal output from the YUV generation unit 41.

Specifically, filter coefficients for shifting the ranges of the frequency bands extracted by the BPF_H61 and the BPF_L62 to the low frequency side as the position of the noted pixel becomes farther from a pixel that exists in the center of the input image or a pixel that is closest to the center (hereinafter, these pixels are collectively referred to as a center pixel) are stored as the parameters. When the BPF_H61 and the BPF_L62 perform the filtering process on the input luminance signal, they obtain the filter coefficient output from the position information table 60 so as to perform the filtering process.

Figure 14A:
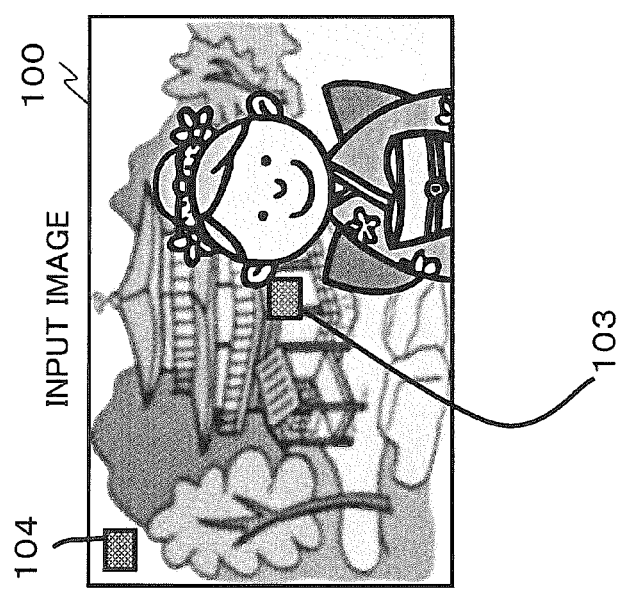
FIGS. 14A and 14B are diagrams illustrating an action of a position information table according to Example 4 of the present invention.
Figure 14B:
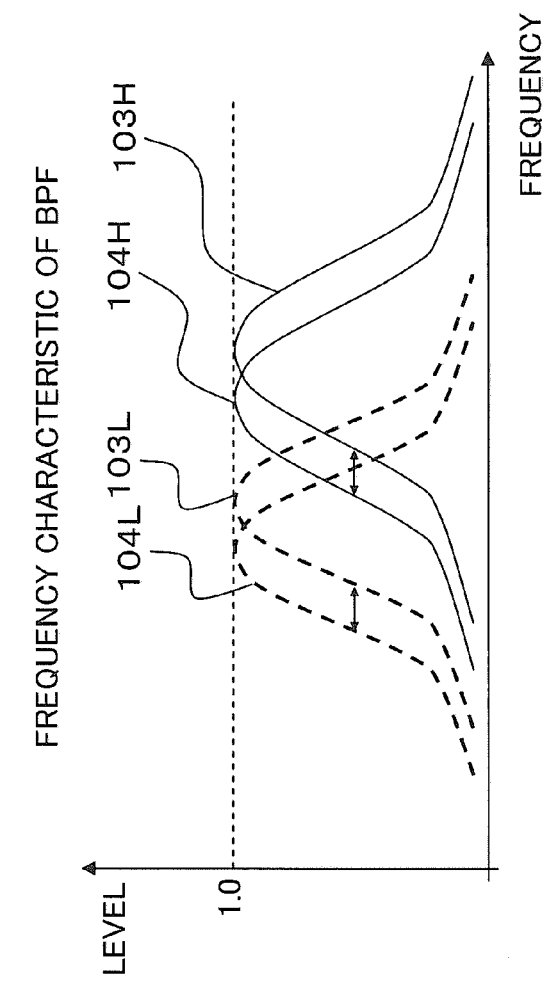

FIG. 14A illustrates the input image 100, a center pixel 103 on the input image 100, and a pixel 104 on a corner of the input image 100 (hereinafter referred to as a corner pixel). FIG. 14B is a diagram illustrating frequency characteristics of the BPF_H61 and the BPF_L62 that are changed in accordance with a pixel position in the input image 100.

When the BPF_H61 performs the filtering process on the center pixel 103 of the input image 100, it obtains a parameter indicating a curve 103H from the position information table 60 so as to perform the filtering process with the frequency characteristic corresponding to the curve 103H. Similarly, when the BPF_L62 performs the filtering process on the center pixel 103 of the input image 100, it obtains a parameter indicating a curve 103L from the position information table 60 so as to perform the filtering process with the frequency characteristic corresponding to the curve 103L.

On the other hand, when the BPF_H61 performs the filtering process on the corner pixel 104 of the input image 100, it obtains a parameter indicating a curve 104H from the position information table 60 so as to perform the filtering process with the frequency characteristic corresponding to the curve 104H. Similarly, when the BPF_L62 performs the filtering process on the corner pixel 104 of the input image 100, it obtains a parameter indicating a curve 104L from the position information table 60 so as to perform the filtering process with the frequency characteristic corresponding to the curve 104L. The center frequencies of the BPF_H61 and the BPF_L62 when the filtering process is performed on the center pixel 103 of the input image 100 are higher than those when the filtering process is performed on the corner pixel 104 of the input image 100.

According to Example 4, considering a MTF characteristic of the lens included in the lens unit 3 of the image sensing apparatus 1, the filtering process can be performed on each pixel in the input image by the BPF_H61 and the BPF_L62 having frequency characteristics corresponding to each pixel position. Thus, the frequency component ratio calculation unit 52 can calculate the frequency component ratio accurately. As a result, the emphasized image can be generated more accurately.

Note that, as a matter of course, it is possible to use the position information table 60 in Example 3 too (see FIG. 12). Further, in Example 3, it is possible that the ranges of the frequency bands extracted by the H_BPF_53, H_BPF_L54 V_BPF_H55, and V_BPF_L56 are variable in accordance with a parameter from the position information table 60, and thus it is possible to obtain the same effect as in Example 4.

EXAMPLE 5

Example 5 will be described. FIG. 15 is a diagram illustrating Example 5 of the emphasized image generation process in the image processing unit 7. Individual portions illustrated in FIG. 15 may be disposed in the image processing unit 7. In FIG. 15, a part denoted by the same numeral as that in FIG. 10 is a part having the same function and action as the part of Example 2, and therefore descriptions of the function and the action are omitted.

The position information table 63 stores a gain value in advance for each frequency of the luminance signal contained in the input image. The gain value may be set for each pixel position in the input image. The gain value for the noted pixel position of the input image has a value corresponding to a difference between the MTF of the center pixel of the input image and the MTF of the noted pixel position of the input image.

The position information table 63 obtains the center frequency from the BPF_H50 so as to derive a gain value corresponding to the obtained center frequency of the BPF_H50, which is delivered to a multiplier unit 64. Similarly, the position information table 63 obtains the center frequency from the BPF_L51 so as to derive a gain value corresponding to the obtained center frequency of the BPF_L51, which is delivered to a multiplier unit 65. Hereinafter, the gain value may also be referred simply to as a gain.

Figure 16:
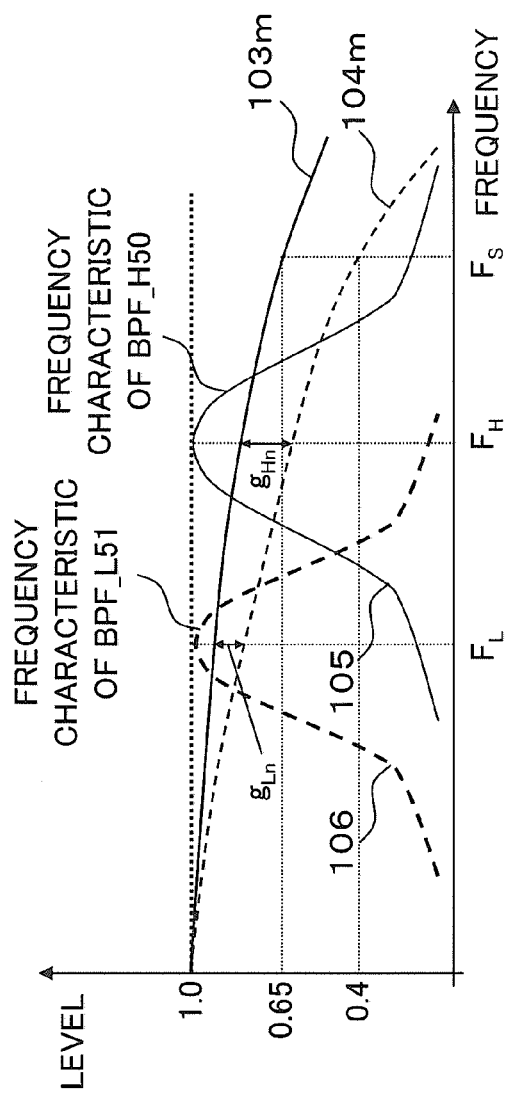
FIG. 16 is a diagram illustrating an action of the position information table according to Example 5 of the present invention.

FIG. 16 illustrates frequency characteristics of the BPF_H50 and the BPF_L51, and the MTFs of the center pixel 103 and the corner pixel 104 illustrated in FIG. 14A. Curve 105 and curve 106 indicate frequency characteristics of the BPF_H50 and the BPF_L51, respectively. $F_H$ and $F_L$ denote center frequencies of the frequency characteristics of the BPF_H50 and the BPF_L51, respectively. Curve 103m indicates the MTF of the center pixel 103 for frequencies of the luminance signal. Curve 104m indicates the MTF of the corner pixel 104 for frequencies of the luminance signal.

Here, for example, it is supposed that a value on the curve 103m and a value on the curve 104m when the frequency of the luminance signal is $F_S$ are 0.65 and 0.4, respectively. This means that a level of the luminance signal at the frequency $F_S$ of the center pixel 103 is 65% of the level that the luminance signal should have originally. Similarly, it means that a level of the luminance signal at the frequency $F_S$ of the corner pixel 104 is 40% of the level that the luminance signal should have originally.

In FIG. 16, $g_{Hn}$ denotes a difference between the MTF of the center pixel 103 and the MTF of the corner pixel 104 at the center frequency $F_H$ in the frequency characteristic of the BPF_H50. Similarly, $g_{Ln}$ denotes a difference between the MTF of the center pixel 103 and the MTF of the corner pixel 104 at the center frequency $F_L$ in the frequency characteristic of the BPF_H50. The position information table 63 stores a gain $G_{Hn}$ corresponding to $g_{Hn}$ and a gain $G_{Ln}$ corresponding to $g_{Ln}$.

The multiplier unit 64 illustrated in FIG. 15 obtains the gain $G_{Hn}$ from the position information table 63, and multiplies the gain $G_{Hn}$ and a result of the filtering process of the corner pixel 104 by the BPF_H50 together so as to output the result. Similarly, the multiplier unit 65 obtains the gain $G_{Ln}$ from the position information table 63, and multiplies the gain $G_{Ln}$ and a result of the filtering process of the corner pixel 104 by the BPF_L51 together so as to output the result. Note that the multiplier unit 64 and the multiplier unit 65 multiply 1.0 with respect to results of filtering processes of the center pixel 103 by the BPF_H50 and the BPF_L51.

According to Example 5, considering the MTF characteristic of the lens included in the lens unit 3 of the image sensing apparatus 1, the gain value corresponding to each pixel position is multiplied to the outputs of the BPF_H50 and the BPF_L51. Thus, the frequency component ratio calculation unit 52 can calculate the frequency component ratio accurately in the same manner as in Example 4. As a result, the emphasized image can be generated more accurately.

Note that, as a matter of course, it is possible to use the position information table 63 in Example 3 too (see FIG. 12). Further, in Example 3, it is possible to multiple the four types of gain values obtained from the position information table 63 to outputs of the H_BPF_H53, the H_BPF_L54, the V_BPF_H55, and the V_BPF_L56 so as to obtain the same effect as in Example 5.

EXAMPLE 6

Figure 17:
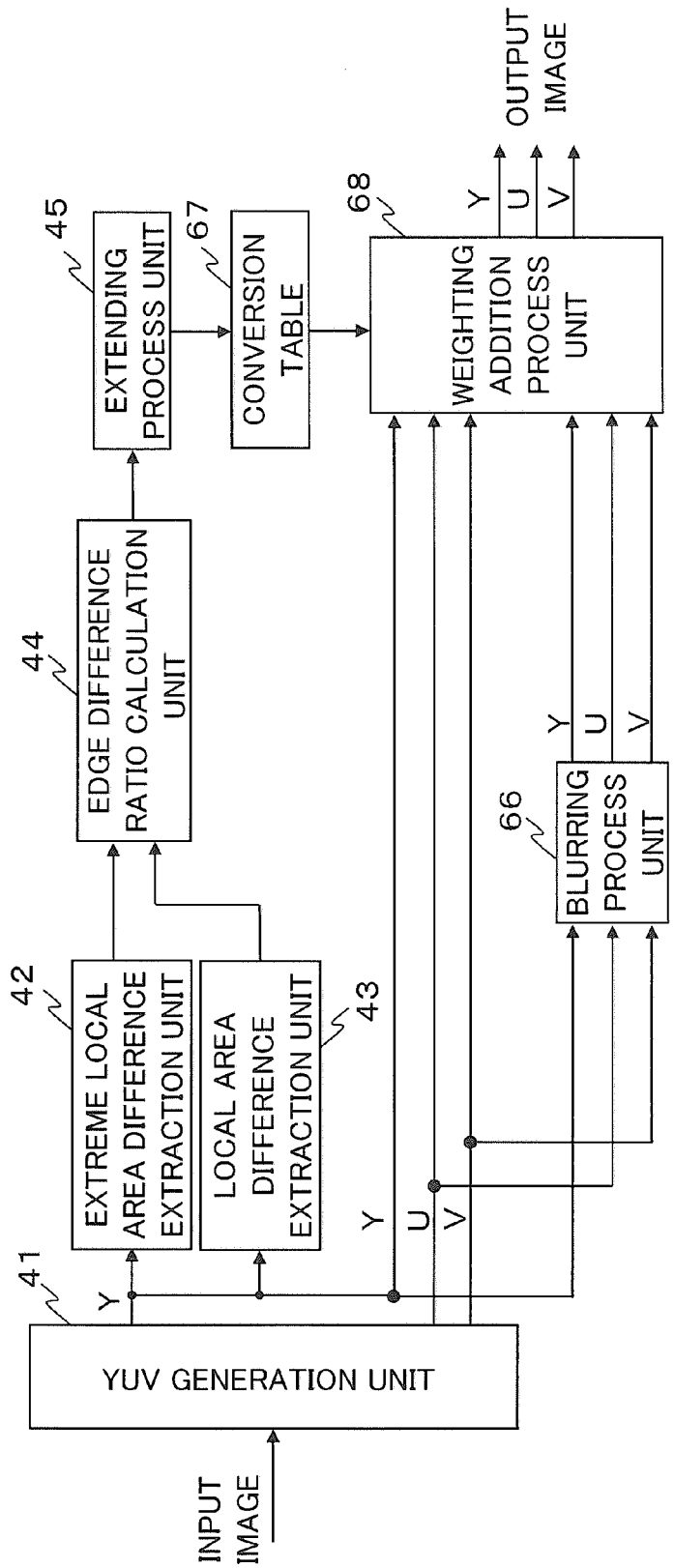
FIG. 17 is a diagram illustrating an action of the emphasized image generation process according to Example 6 of the present invention.

Example 6 will be described. FIG. 17 is a diagram illustrating Example 6 of the emphasized image generation process in the image processing unit 7. Individual portions illustrated in FIG. 17 may be disposed in the image processing unit 7. In FIG. 17, a part denoted by the same numeral as that in FIG. 5 is a part having the same function and action as the part of Example 1, and therefore descriptions of the function and the action are omitted.

In FIG. 17, a blurring process unit 66 performs the blurring process on the input image so as to output the blurred image. The blurring process unit 66 can realize the blurring process as described above by using, for example, an averaging filter that smoothes a change of density between neighboring pixel signals or a low pass filter (LPF) that removes high frequency components while remaining low frequency components among spatial frequency components contained in the image signal. As the averaging filter or the LPF described above, for example, it is possible to use those described in the document "Digital Image Processing" published by CG-ARTS Association on Mar. 1, 2007, second edition, pp. 108-110 and 131-133. A conversion table 67 derives an addition ratio K indicating a combination degree of the input image and the blurred image for each pixel of the input image on the basis of the corrected edge difference ratio output from the extending process unit 45.

Figure 18:
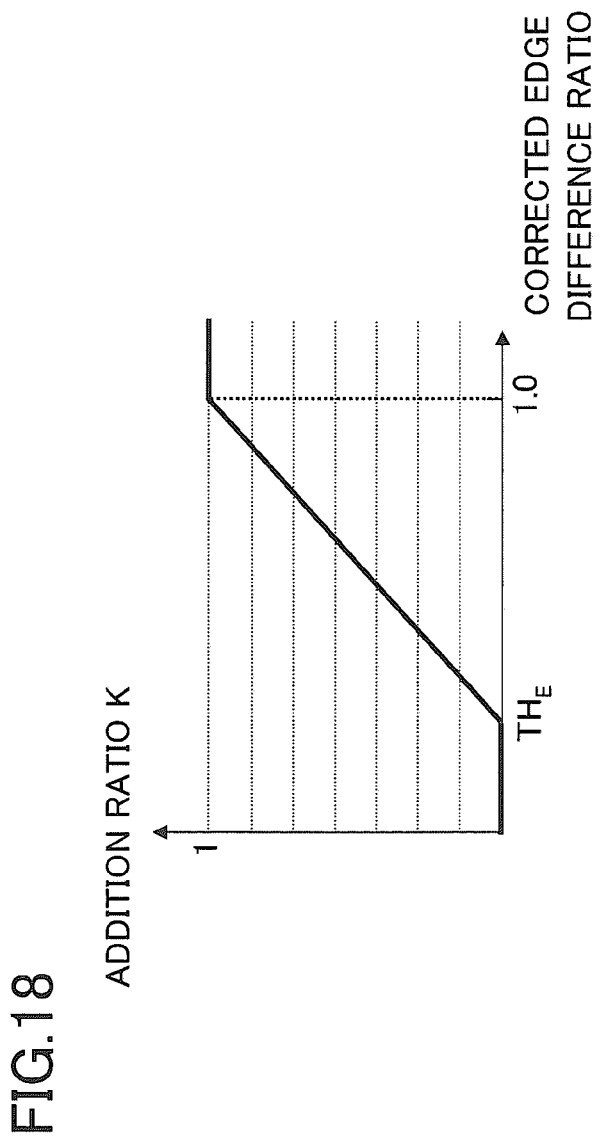
FIG. 18 is a diagram illustrating an action of a conversion table according to Example 6 of the present invention.

A function for the conversion table 67 to derive the addition ratio K is illustrated in FIG. 18. As illustrated in FIG. 18, the conversion table 67 sets the addition ratio K to 0 when the corrected edge difference ratio is smaller than a threshold value $TH_E$ and sets the addition ratio K to 1 when the corrected edge difference ratio is 1.0 or larger. Here, $0 \leq TH_E < 1$ is satisfied. When the corrected edge difference ratio is the threshold value $TH_E$ or larger and is smaller than 1.0, the addition ratio K is increased linearly as the corrected edge difference ratio is increased. Further, in this case, the addition ratio K may be increase nonlinearly as the corrected edge difference ratio is increased. However, it is desirable that the addition ratio K is increased monotonously along with the increase of the corrected edge difference ratio.

A weighting addition process unit 68 combines the input image and the blurred image on the basis of the addition ratio K so as to generate the output image. In other words, the pixel signal of the input image and the pixel signal of the blurred image are mixed for each pixel position at a mixing ratio in accordance with the addition ratio K, so that the image having the individual pixel signals obtained by the mixing is generated as the output image. The image signal of a certain pixel or a certain pixel position is referred to as a pixel signal. A value of the pixel signal is referred to as a pixel value. The weighting addition process unit 68 may perform the mixing for each of the Y, U, and V signals individually. Specifically, the weighting addition process is performed for each pixel in accordance with the following equation (4) so that the output image is generated. In other words, when the pixel signals of the input image, the blurred image, and the output image at the same pixel position are denoted by $S_{IN}$, $S_{BLUR}$, and $S_{OUT}$, "$S_{OUT}=(S_{IN} \times K)+(S_{BLUR} \times (1-K))$" is satisfied.

output image=(input image×addition ratio $K$)+(blurred image ×(1−addition ratio $K$)) (4)

According to the above equation (4), for example, when the input image is the input image 100 illustrated in FIG. 3A, the corrected edge difference ratio is large for the person 101. Therefore, the addition ratio K of the pixel corresponding to the image of the person 101 becomes 1 or a value close to 1. Therefore, the image of the person 101 in the output image is substantially the same as the image of the person 101 in the input image 100.

On the other hand, since the image of the building 102 in the input image 100 is not in focus, the corresponding corrected edge difference ratio has a value smaller than 1. Therefore, the addition ratio K becomes close to zero, and the image of the building 102 in the input image 100 is mixed with the image of the building 102 in the blurred image so that the image of the building 102 in the output image is generated. Therefore, the image of the building 102 in the output image becomes an image having a larger blurring effect than the image of the building 102 in the input image 100. As a result, the output image becomes an image in which the person 101 is emphasized in view.

Note that, as a matter of course, in FIG. 10 of Example 2, FIG. 12 of Example 3, FIG. 13 of Example 4, and FIG. 15 of Example 5, the conversion table 67, the blurring process unit 66, and the weighting addition process unit 68 illustrated in FIG. 17 can be used instead of the conversion table 46, the blurring process unit 47, and the edge emphasizing process unit 48, respectively.

When Example 2, 4, or 5 is modified, the conversion table 67 is supplied with the frequency component ratio, and the horizontal axis in the function of the conversion table 67 illustrated in FIG. 18 becomes the frequency component ratio.

When Example 3 is modified, the conversion table 67 is supplied with the horizontal frequency component ratio or the vertical frequency component ratio, and the horizontal axis in the function of the conversion table 67 illustrated in FIG. 18 becomes the horizontal frequency component ratio or the vertical frequency component.

In FIG. 5 of Example 1, FIG. 10 of Example 2, FIG. 12 of Example 3, FIG. 13 of Example 4, and FIG. 15 of Example 5, it is possible to use a variable luminance reducing process unit (not shown) which reduces only a level of the Y signal in accordance with the blurring degree output from the conversion table 46 instead of the blurring process unit 47. In addition, in FIG. 17 of Example 6, it is possible to use a fixed luminance reducing process unit (not shown) that reduces only a level of the Y signal instead of the blurring process unit 66. Thus, for example, when the input image is the input image 100 illustrated in FIG. 3A, luminance of the unfocused building 102 is reduced, so it is possible to obtain an output image in which the person 101 is emphasized and enhanced in view.

In addition, in FIG. 5 of Example 1, FIG. 10 of Example 2, FIG. 12 of Example 3, FIG. 13 of Example 4, and FIG. 15 of Example 5, it is possible to use a variable saturation reducing process unit (not shown) which reduces only levels of the U and V signals in accordance with the blurring degree output from the conversion table 46 instead of the blurring process unit 47. In addition, in FIG. 17 of Example 6, it is possible to use a fixed saturation reducing process unit (not shown) that reduces only levels of the U and V signals instead of the blurring process unit 66. Thus, for example, when the input image is the input image 100 illustrated in FIG. 3A, color saturation of the unfocused building 102 is reduced, so it is possible to obtain an output image in which the person 101 is emphasized and enhanced in view.

In addition, in this example and its variations, the emphasized image generation process is performed by pixel unit of the input image, but this structure is not a limitation. For instance, a small area including a plurality of pixels may be a unit for performing the emphasized image generation process. In this case, it is possible to reduce a throughput of the emphasized image generation process. However, it is possible to interpret that the small area is constituted of only one pixel.

Figure 19:
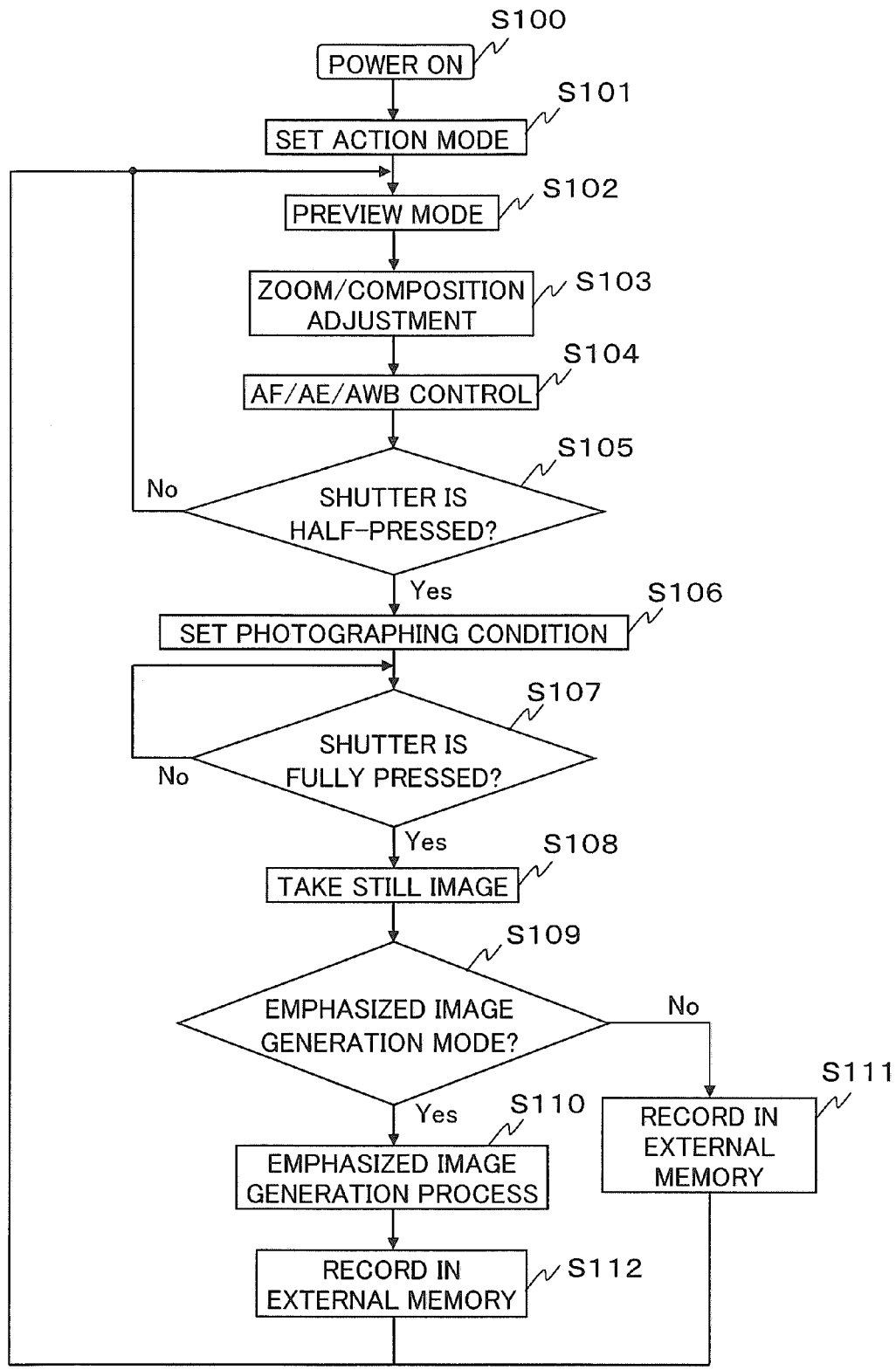
FIG. 19 is a flowchart illustrating a procedure of generating an emphasized image by the image sensing apparatus illustrated in FIG. 1.

FIG. 19 is a flowchart illustrating a series of processes until the image sensing apparatus 1 generates the emphasized image. When the image sensing apparatus 1 is powered on in Step S100, the process goes to Step S101.

In Step 101, the photographer selects an action mode of the image sensing apparatus 1. Selectable action modes of the image sensing apparatus 1 includes a photographing mode for taking a moving image and a still image, and a reproducing mode for reproducing a taken image that is photographed and stored in the external memory 22. Here, it is supposed that the photographer has selected the photographing mode, and further an emphasized image generation mode.

In Step 102, the image sensing apparatus 1 starts a preview mode. In the preview mode, the analog image signal obtained by the photoelectric conversion in the image sensor 2 via the lens unit 3 is converted into the digital image signal in the AFE 4 and is delivered to the image processing unit 7. Then, the image processing unit 7 performs image processings such as the AF process, the AE process, and the white balance process on the digital image signal, and the image of the result is displayed on the display unit 13 via the image signal output unit 12.

In Step 103, a composition of the imaging target objects and the zoom magnification are adjusted by the photographer.

In Step 104, the image sensing apparatus 1 performs the AF, AE, and AWB control under the composition and the zoom magnification set in Step S103.

In Step 105, the CPU 17 decides whether or not a so-called half-pressing of the shutter button of the operation unit 19 is performed.

The operation unit 19 of the image sensing apparatus 1 is equipped with the shutter button (not shown) for taking a still image. The shutter button has a two-step switch. When the photographer presses the shutter button by substantially a half stroke, a first switch is turned on. When the shutter button is pressed fully, the second switch is turned on. Hereinafter, to press the shutter button fully is referred to as "full pressing".

When it is decided that the shutter button is half-pressed, the process goes to Step S106. Otherwise, the process goes back to Step S102, in which the image sensing apparatus 1 continues the preview mode.

In Step 106, the image sensing apparatus 1 makes focus on the subject noted by the photographer (e.g., the person 101 illustrated in FIG. 3A) by the AF function, and sets the opening amount of the aperture stop 32 and the exposure time of the image sensor 2 (i.e., shutter speed) by the AE function. Further, the image sensing apparatus 1 sets the hue by the AWB function.

In Step 107, the CPU 17 decides whether or not the shutter button is fully pressed. When it is decided that shutter button is fully pressed, the process goes to Step S108. Otherwise, namely when the half-pressed state thereof is maintained, the image sensing apparatus 1 maintains the photographing condition set in Step S107 until the full pressing is performed.

In Step 108, the image sensing apparatus 1 takes a still image with the photographing condition set in Step S106, so that the input image 100 illustrated in FIG. 3A is obtained, for example. The input image is stored as RAW data or YUV format data in the frame memory 5, and the process goes to Step S109.

In Step 109, the CPU 17 decides whether or not the emphasized image generation mode is set. When the emphasized image generation mode is set, the process goes to Step S110. Otherwise, the process goes to Step S111.

In Step 110, the emphasized image is generated from the input image obtained by photography by using the emphasized image generation process described in any one of examples or variations in this embodiment, and the process goes to Step S112. It is possible to generate any output image (e.g., output image generated by the edge emphasizing process unit 48 or the weighting addition process unit 68) as the emphasized image.

In Step 111, under control of the CPU 17, the image processing unit 7 performs the image processing on the input image obtained by photography, and then the compression process unit 9 performs the compression process on the result. The input image after the processes is stored in the external memory 22. Then, the process goes back to Step S102.

In Step 112, under control of CPU 17, the image processing unit 7 performs the image processing on the input image obtained by photography (e.g., input image 100) and the emphasized image, and then the compression process unit 9 performs the compression process on the results. The input image and the emphasized image after the processes are stored in the external memory 22. Then, the process goes back to Step S102.

EXAMPLE 7

Figure 20:
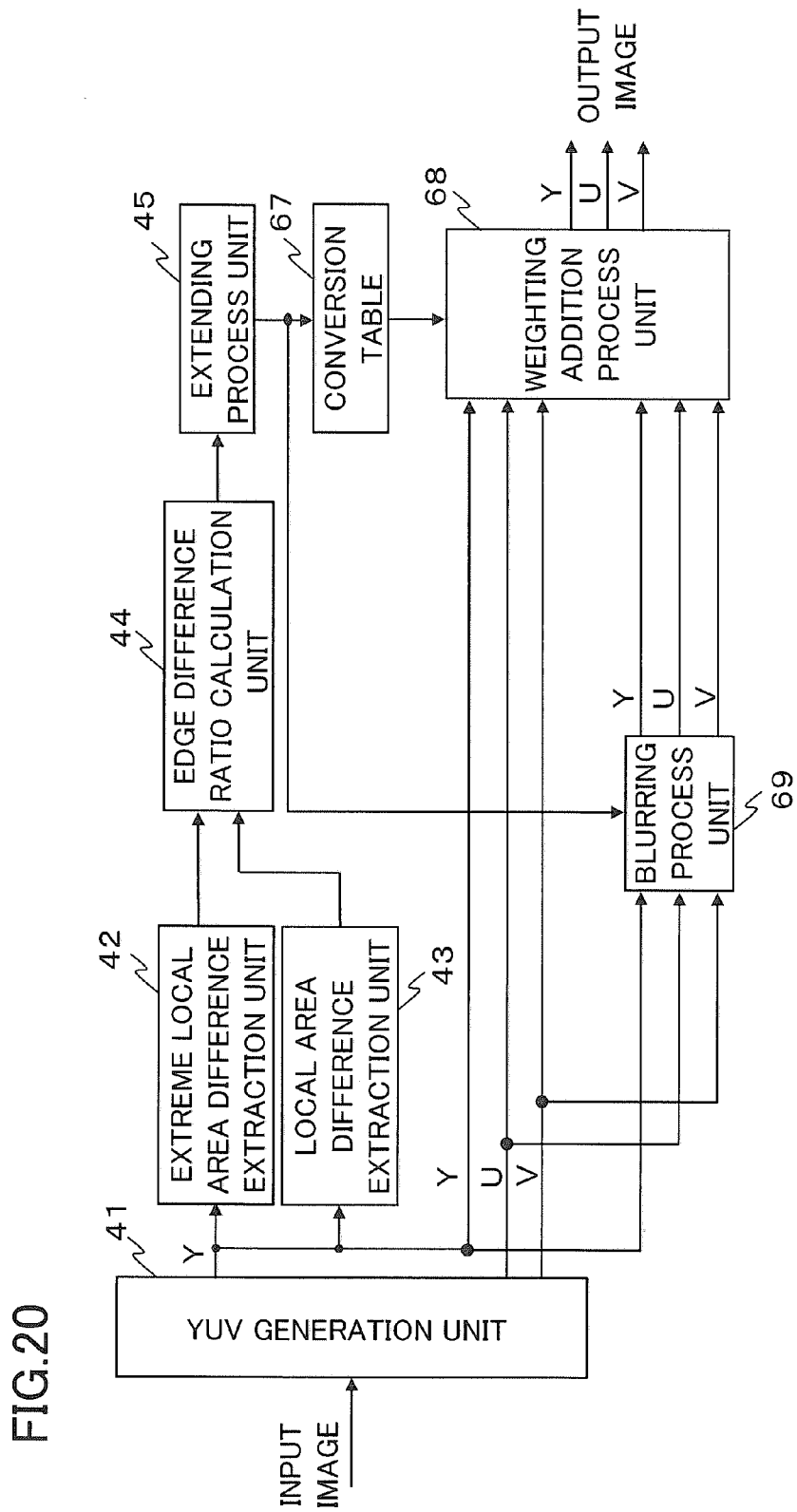
FIG. 20 is a diagram illustrating an action of the emphasized image generation process according to Example 7 of the present invention.

Example 7 will be described. FIG. 20 is a diagram illustrating Example 7 of the emphasized image generation process in the image processing unit 7. Individual portions illustrated in FIG. 20 may be disposed in the image processing unit 7. In FIG. 20, a part denoted by the same numeral as that in FIG. 17 is a part having the same function and action as the part of Example 6, and therefore descriptions of the function and the action are omitted. In FIG. 20, a blurring process unit 69 performs the blurring process on the input image so as to generate and output the blurred image. The blurring process unit 69 uses, for example, an averaging filter that smoothes a change of density between pixel signals in the input image, a low pass filter (LPF) that removes high frequency components while remaining low frequency components among spatial frequency components contained in the image signal, or a Gaussian filter that assigns a larger weight to a pixel closer to the pixel to be processed so that the weight has a distribution close to a Gaussian distribution, for realizing the blurring process. Hereinafter, the filter that realizes the blurring process is referred to as a blurring filter.

The blurring process unit 69 normalizes the corrected edge difference ratio of each pixel in the input image output from the extending process unit 45 so as to be within the range between 0.0 and 1.0, and the normalized corrected edge difference ratio is used as the focus degree of each pixel. For instance, it is supposed that the corrected edge difference ratios of the pixels P44 and P45 output from the extending process unit 45 are d44 and d45, respectively, and the corrected edge difference ratios obtained by performing the above-mentioned normalization on the corrected edge difference ratios d44 and d45 are 44' and d45', respectively. Then, d44' and d45' are used as focus degrees of the pixels P44 and P45, respectively. The same is true for other pixels. When the blurring process unit 69 performs the blurring process on the pixel to be a target of the blurring process (hereinafter referred to also as a target pixel), it changes the blurring degree of the blurring process in accordance with a focus degree of the target pixel. Hereinafter, as a specific example of the blurring process performed by the blurring process unit 69, blurring process examples $7_A$ to $7_E$ will be described. The blurring process examples $7_A$ to $7_E$ can be regarded as a part of Example 7.

<Blurring Process Example $7_A$>The blurring process example $7_A$ will be described. The blurring process unit 69 changes a filter size of the blurring filter to be used for the blurring process performed on the target pixel in accordance with a focus degree of the target pixel in the input image. When the focus degree of the target pixel is a predetermined threshold value TH1 or larger, the blurring process unit 69 sets the filter size of the blurring filter to be relatively small. When the focus degree of the target pixel is smaller than the predetermined threshold value TH1, the blurring process unit 69 sets the filter size to be relatively large. For instance, it is possible to set the threshold value TH1 so that "0<TH1<1" is satisfied.

For instance, in the case where the predetermined threshold value TH1 is 0.5, the blurring process unit 69 decides that the target pixel is close to the focused state when the focus degree of the target pixel is 0.5 or larger, so that the filter size in the blurring process performed on the target pixel is set to 3×3. On the contrary, when the focus degree of the target pixel is smaller than 0.5, it is decided that the target pixel is close to the unfocused state, so that the filter size in the blurring process performed on the target pixel is set to 5×5. In the blurring process using a blurring filter having a filter size of Q×Q, pixel signals of (Q×Q) pixels with respect to the target pixel as its center are used for generating the pixel signal of the target pixel after the blurring process (Q is an integer). Therefore, it can be regarded that the blurring degree of the target pixel becomes larger as the filter size in the blurring process performed on the target pixel is larger.

According to the blurring process performed by the blurring process unit 69, when the target pixel is close to the focused state, a pixel value of only a pixel that is extremely adjacent to the target pixel, for example, only a pixel neighboring the target pixel is used for the filtering process. Therefore, the blurring degree of the target pixel has a tendency to be small. On the contrary, when the target pixel is close to the unfocused state, not only a pixel value of the extremely adjacent pixel of the target pixel but also a pixel value of a pixel at a position far from the target pixel is used for the filtering process. Therefore, the blurring degree of the target pixel has a tendency to become large. In other words, the blurring process is performed on the input image so that the blurring degree becomes small for a pixel close to the focused state and that the blurring degree becomes large for a pixel close to the unfocused state. As a result, it is possible to generate more effectively an image in which the focused subject is emphasized.

<Blurring Process Example $7_B$>

The blurring process example $7_B$ will be described. The blurring process unit 69 performs a mask process on the blurring filter on the basis of the focus degree of the pixel that is used in the blurring process by the blurring filter, and generates the blurring filter after the mask process as a corrected blurring filter. The blurring process unit 69 performs the blurring process on the input image using the corrected blurring filter. Here, it is supposed that the blurring process unit 69 uses the blurring filter having a filter size of 5×5.

FIG. 21A indicates a blurring filter having a filter size of 5×5. The filter having a filter size of 5×5 is expressed by a matrix of five rows and five columns. Therefore, the blurring filter is constituted of 25 arranged elements. Each of the 25 elements constituting the blurring filter is referred to as a blurring filter element (also referred to simply as a filter element). In FIG. 21A, a to y denotes blurring filter elements. Each blurring filter element has a predetermined filter coefficient. In FIG. 21B, Ca to Cy denote filter coefficients of the blurring filter elements a to y, respectively. Note that the filter coefficients Ca to Cy of the blurring filter elements may be collectively referred to as a filter coefficient of the blurring filter. Here, the target pixel in the input image to be a target of the blurring process using the blurring filter is a pixel corresponding to the blurring filter element m. The blurring filter element m is positioned at the center of the blurring filter.

The blurring process unit 69 generates the mask filter for performing the mask process on the blurring filter, on the basis of the focus degree of the target pixel (pixel corresponding to the blurring filter element m) and the focus degree of the pixel corresponding to each blurring filter element (except the blurring filter element m). In other words, the mask filter is generated on the basis of the focus degree of the target pixel and the focus degree of each non-target pixel. Here, it is supposed that the blurring filter has a filter size of 5×5, so the number of non-target pixels is 24. That is, the non-target pixels mean pixels obtained by removing the target pixel from the total 25 pixels positioned in the image area of 5×5 pixels with respect to the target pixel as its center. The filter size of the generated mask filter is the same as the filter size of the blurring filter. Here, meanings of the mask filter element of the mask filter and the filter coefficient of the mask filter are the same as those in the case of the blurring filter. Next, the blurring process unit 69 multiplies the filter coefficient of the mask filter to the filter coefficient of the blurring filter so as to generate the corrected blurring filter. In this case, the filter coefficients that are corresponding to each other are multiplied. In other words, for example, the filter coefficient of the mask filter element positioned at the center of the mask filter is multiplied to the filter coefficient Cm corresponding to the target pixel, and a result of the multiplication is substituted into the filter coefficient of the element positioned at the center of the corrected blurring filter.

The blurring filter elements a to y is regarded as the first to the 25th blurring filter elements, and the focus degree of the pixel corresponding to the i-th blurring filter element is expressed by FD[i] (i denotes an integer). The blurring process unit 69 generates the mask filter in accordance with the following rule, for example. A case where the focus degree of the target pixel is larger than a predetermined threshold value TH1 is referred to as case C[1], and a case where the focus degree of the target pixel is the threshold value TH1 or lower is referred to as case C[2].

In the case C[1], the filter coefficient of the mask filter element can be set for each mask filter element in accordance with rules [1-1] and [1-2]. In case C[2], the filter coefficient of the mask filter element can be set for each mask filter element in accordance with rules [2-1] and [2-2].

The rule [1-1] is a rule describing that when "TH1<FD[i]≦1" is satisfied, the filter coefficient of the mask filter element corresponding to the i-th blurring filter element is set to 1.

The rule [1-2] is a rule describing that when "0≦FD[i]≦TH1" is satisfied, the filter coefficient of the mask filter element corresponding to the i-th blurring filter element is set to 0.

The rule [2-1] is a rule describing that when "TH1<FD[i]≦1" is satisfied, the filter coefficient of the mask filter element corresponding to the i-th blurring filter element is set to 0.

The rule [2-2] is a rule describing that when "0≦FD[i]≦TH1" is satisfied, the filter coefficient of the mask filter element corresponding to the i-th blurring filter element is set to 1.

Figure 22:
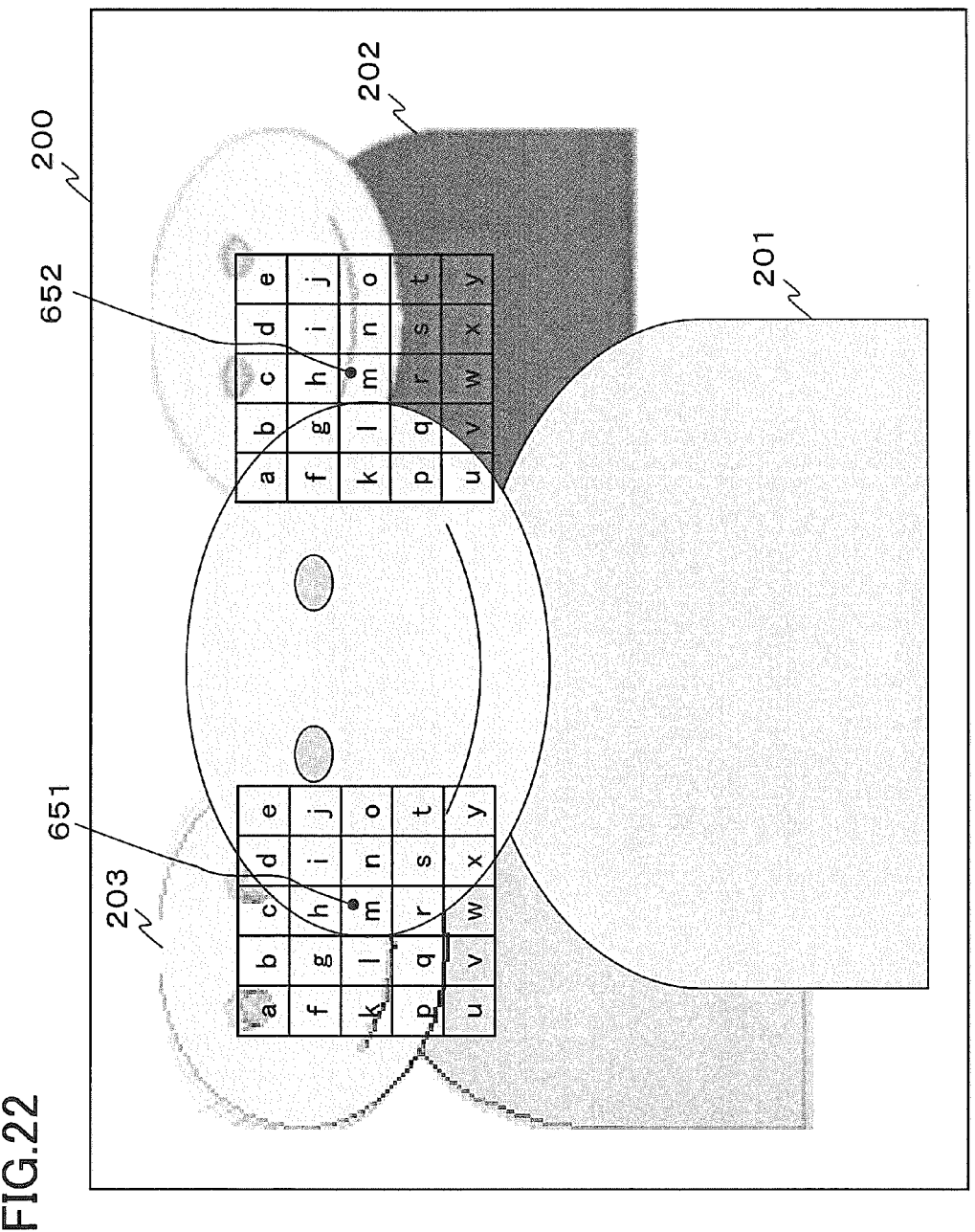
FIG. 22 is a diagram illustrating an action of the blurring process unit in Example 7 of the present invention (blurring process example $7_B$).

FIG. 22 is a diagram illustrating the blurring process performed on an input image 200 by the blurring process unit 69. It is supposed that a person 201 is in focus while persons 202 and 203 are not in focus in the input image 200. The blurring process unit 69 generates the mask filter in each position while shifting the position of the blurring filter one by one pixel in the horizontal direction and in the vertical direction. Then, the blurring process unit 69 generates the corrected blurring filter on the basis of the blurring filter and the generated mask filter, so as to perform the blurring process on the target pixel using the corrected blurring filter.

A manner how the blurring process unit 69 performs the blurring process when the blurring filter is at position 651 (e.g., the center of the blurring filter is at the position 651) will be described. It is supposed that when the blurring filter is at the position 651, the pixel corresponding to the blurring filter element m is a pixel in a part of face of the focused person 201, and that the focus degree of the pixel corresponding to the blurring filter element m is larger than TH1 and is 1 or smaller. In addition, it is supposed that the focus degree of each of pixels corresponding to the blurring filter elements a, b, c, f, g, k, l, p, q, u, v, and w is 0 or larger and is TH1 or smaller, and that the focus degree of each of the pixels corresponding to the blurring filter elements d, e, h, i, j, m, n, o, r, s, t, x, and y is larger than TH1 and is 1 or smaller.

Figures 23A, 23B:
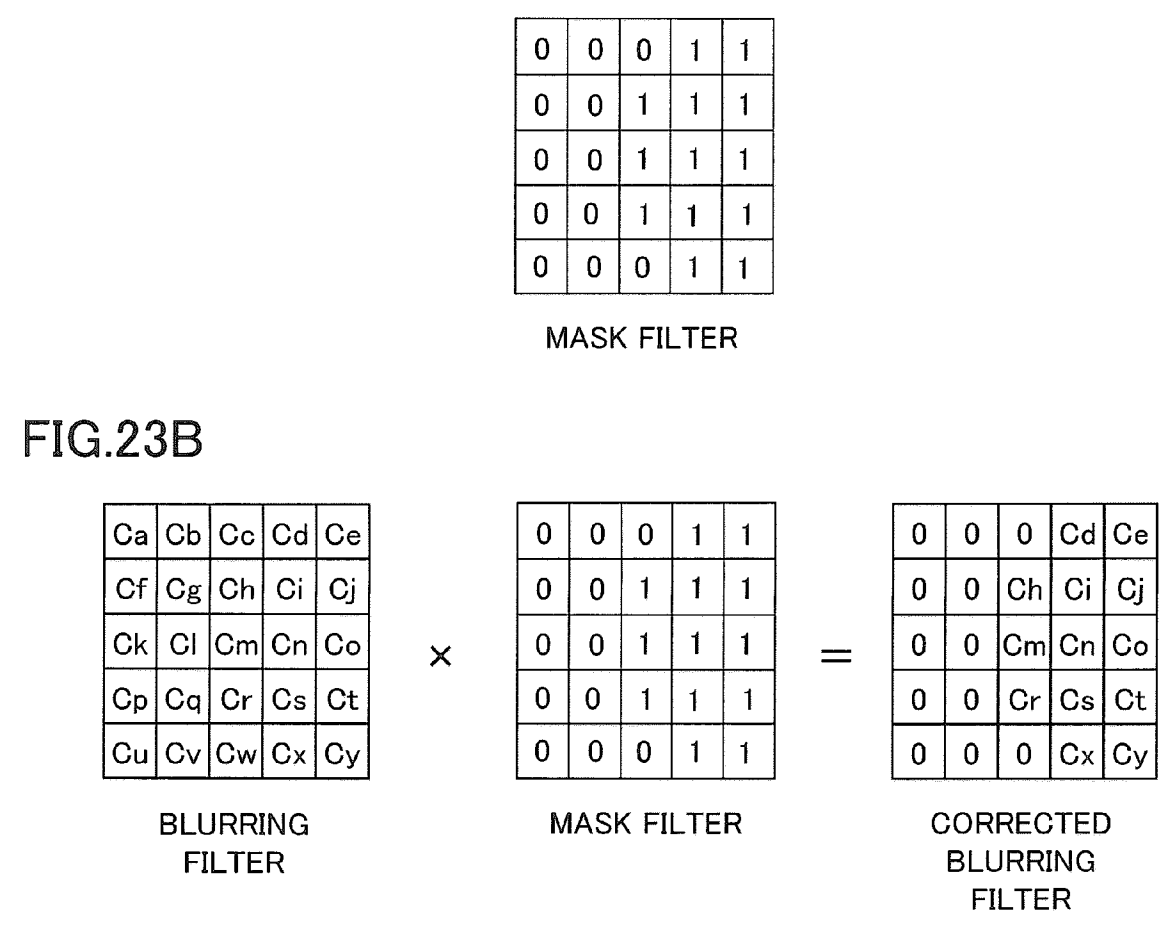

In this case, the blurring process unit 69 sets the filter coefficients of the mask filter elements corresponding to the blurring filter elements a, b, c, f, g, k, l, p, q, u, v, and w to 0 in accordance with the rule [1-2], and sets the filter coefficients of the mask filter elements corresponding to the blurring filter elements d, e, h, i, j, m, n, o, r, s, t, x, and y to 1 in accordance with the rule [1-1], so as to generate the mask filter as illustrated in FIG. 23A. As illustrated in FIG. 23B, the blurring process unit 69 multiplies the filter coefficient of the blurring filter and the filter coefficient of the mask filter together so as to generate the corrected blurring filter. The blurring process unit 69 uses the generated corrected blurring filter for performing the blurring process on the target pixel at the position 651 (target pixel in the input image 200). In other words, when the blurring process unit 69 performs the blurring process on the target pixel having a focus degree of TH1 or larger, it uses only the pixel value of the pixel having the focus degree that is TH1 or larger for performing the blurring process. Thus, in the blurring process performed on a focused target pixel, it is possible to reduce a color migration that may occur when a color of unfocused pixel is mixed.

It is supposed that when the blurring filter is at position 652 (e.g., the center of the blurring filter is at the position 652), the pixel corresponding to the blurring filter element m is a pixel in a part of body of the unfocused person 202, and that the focus degree of the pixel corresponding to the blurring filter element m is 0 or larger and is TH1 or smaller. In addition, it is supposed that the focus degree of each of pixels corresponding to the blurring filter elements a, f, g, k, l, p, q, and u is larger than TH1 and is 1 or smaller, and that the focus degree of each of the pixels corresponding to the blurring filter elements b, c, d, e, h, i, j, m, n, o, r, s, t, v, w, x, and y is 0 or larger and is TH1 or smaller.

Figures 24A, 24B:
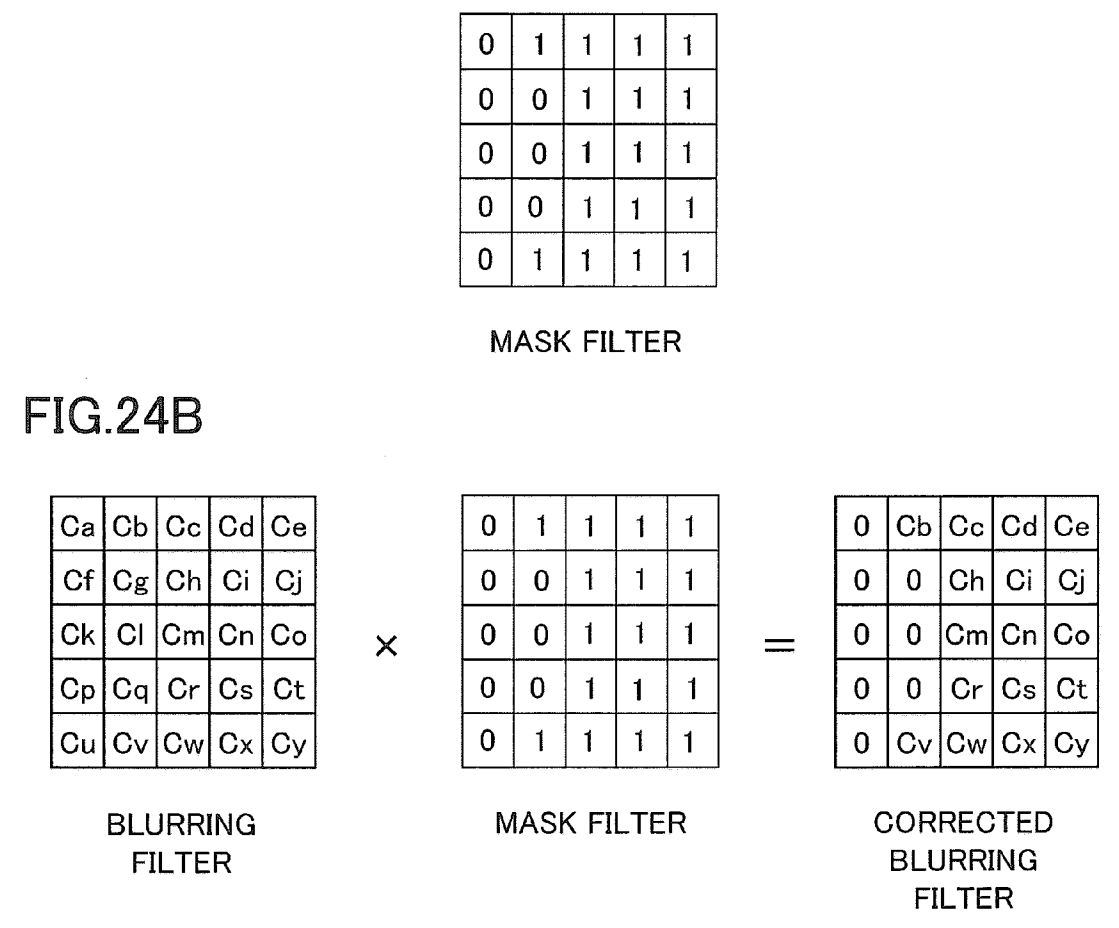

In this case, the blurring process unit 69 sets the filter coefficient of the mask filter elements corresponding to the blurring filter elements a, f, g, k, l, p, q, and u to 0 in accordance with the rule [2-1], and sets the filter coefficient of the mask filter elements corresponding to the blurring filter elements b, c, d, e, h, i, j, m, n, o, r, s, t, v, w, x, and y to 1 in accordance with the rule [2-2], so as to generate the mask filter as illustrated in FIG. 24A. As illustrated in FIG. 24B, the blurring process unit 69 multiplies the filter coefficient of the blurring filter and the filter coefficient of the mask filter together so as to generate the corrected blurring filter. The blurring process unit 69 uses the generated corrected blurring filter for performing the blurring process on the target pixel at the position 652 (target pixel in the input image 200). In other words, when the blurring process unit 69 performs the blurring process on the target pixel having a focus degree smaller than TH1, it uses only the pixel value of the pixel having the focus degree that is smaller than TH1 for performing the blurring process. Thus, in the blurring process performed on an unfocused target pixel, it is possible to reduce a color migration that may occur when a color of focused pixel is mixed.

<Blurring Process Example $7_C$>

The blurring process example $7_C$ will be described. Similarly to the blurring process example $7_B$, the blurring process unit 69 performs the mask process on the blurring filter on the basis of the focus degree of the pixel that is used in the blurring process by the blurring filter, so as to generate the corrected blurring filter. Then, the blurring process unit 69 performs the blurring process on the input image using the corrected blurring filter. Hereinafter, a difference from the blurring process example $7_B$ will be described.

The blurring process unit 69 divides a range of numeric values that the focus degree can have, namely the range from 0.0 to 1.0 into predetermined ranges of three or more small ranges. Then, the blurring process unit 69 generates the mask filter on the basis of which one of the divided small ranges the focus degree of the target pixel (pixel corresponding to the blurring filter element m) and the focus degree of the pixel corresponding to each blurring filter element (except the blurring filter element m) belong to. Then, the corrected blurring filter is generated on the basis of the blurring filter and the generate mask filter, so that the corrected blurring filter is used for performing the blurring process on the target pixel.

The blurring process unit 69 can divide the range of numeric values that the focus degree can have into three small ranges using predetermined threshold values TH1 and TH2 satisfying "0<TH1<TH2<1", for example, so as to generate the mask filter in accordance with the following rule. A case where the focus degree of the target pixel is larger than the threshold value TH1 and is the threshold value TH2 or smaller is referred to as case C[3]. A case where the focus degree of the target pixel is larger than the threshold value TH2 and is 1 or smaller is referred to as case C[4]. A case where the focus degree of the target pixel is 0 or larger and is the threshold value TH1 or smaller is referred to as case C[5].

In the case C[3], the filter coefficient of the mask filter element can be set for each mask filter element in accordance with rules [3-1], [3-2] and [3-3]. In the case C[4], the filter coefficient of the mask filter element can be set for each mask filter element in accordance with rules [4-1], [4-2] and [4-3]. In the case C[5], the filter coefficient of the mask filter element can be set for each mask filter element in accordance with rules [5-1], [5-2] and [5-3].

The rule [3-1] is a rule describing that when "TH2<FD[i] ≦1" is satisfied, the filter coefficient of the mask filter element corresponding to the i-th blurring filter element is set to 0.

The rule [3-2] is a rule describing that when "TH1<FD[i] ≦TH2" is satisfied, the filter coefficient of the mask filter element corresponding to the i-th blurring filter element is set to 1.

The rule [3-3] is a rule describing that when "0≦FD[i] ≦TH1" is satisfied, the filter coefficient of the mask filter element corresponding to the i-th blurring filter element is set to 0.

The rule [4-1] is a rule describing that when "TH2<FD[i] ≦1" is satisfied, the filter coefficient of the mask filter element corresponding to the i-th blurring filter element is set to 1.

The rule [4-2] is a rule describing that when "TH1<FD[i] ≦TH2" is satisfied, the filter coefficient of the mask filter element corresponding to the i-th blurring filter element is set to 0.

The rule [4-3] is a rule describing that when "0≦FD[i] ≦TH1" is satisfied, the filter coefficient of the mask filter element corresponding to the i-th blurring filter element is set to 0.

The rule [5-1] is a rule describing that when "TH2<FD[i] ≦1" is satisfied, the filter coefficient of the mask filter element corresponding to the i-th blurring filter element is set to 0.

The rule [5-2] is a rule describing that when "TH1<FD[i] ≦TH2" is satisfied, the filter coefficient of the mask filter element corresponding to the i-th blurring filter element is set to 0.

The rule [5-3] is a rule describing that when "0≦FD[i] ≦TH1" is satisfied, the filter coefficient of the mask filter element corresponding to the i-th blurring filter element is set to 1.

Figure 25:
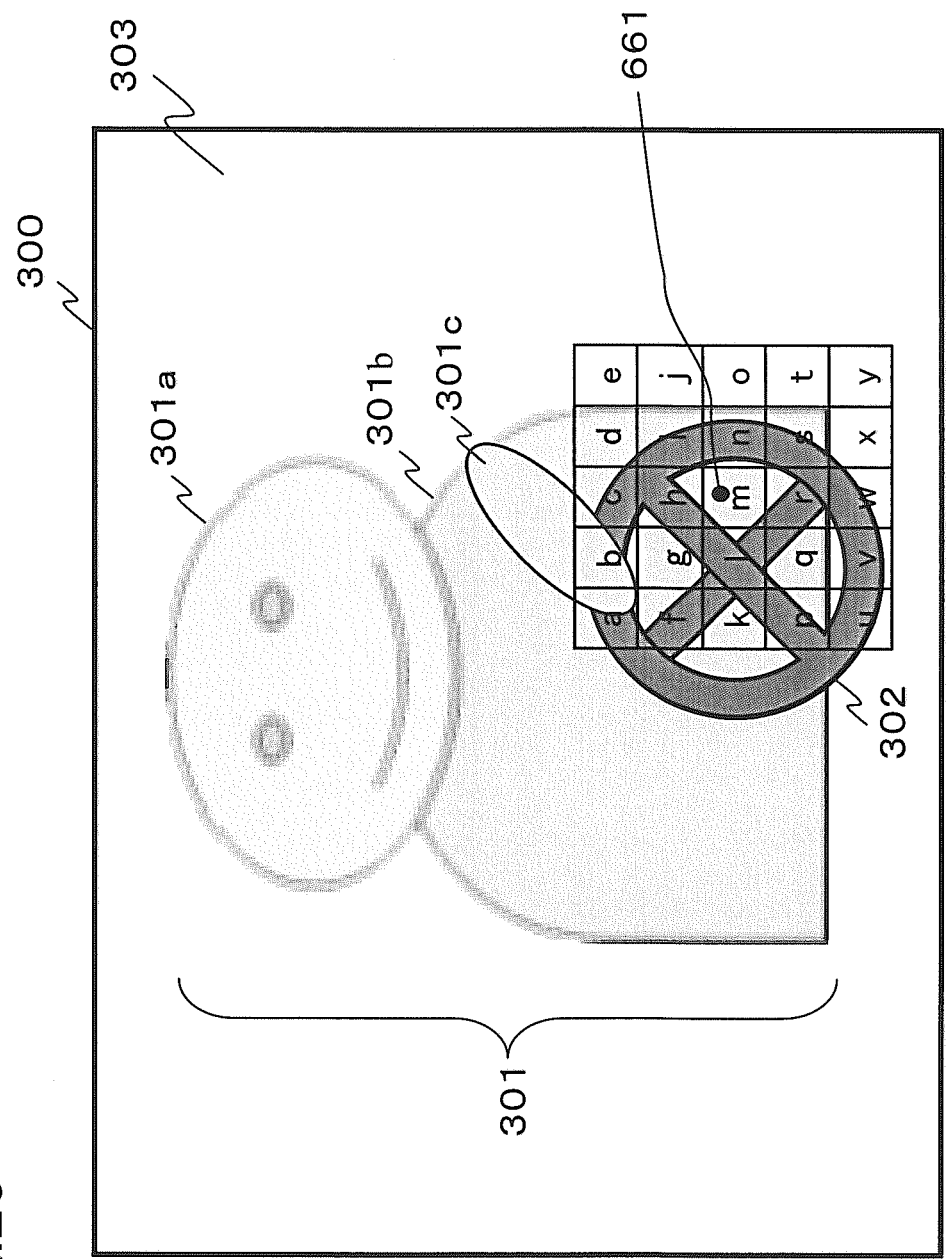
FIG. 25 is a diagram illustrating an action of the blurring process unit in Example 7 of the present invention (blurring process example $7_C$).

FIG. 25 is a diagram illustrating the blurring process performed by the blurring process unit 69. In an input image 300 illustrated in FIG. 25, a person 301 includes a face part 301a, a body part 301b, and an arm part 301c. It is supposed that the person 301 wears blue color clothes. Therefore, although not apparent from FIG. 25, the body part 301b and the arm part 301c have blue color. In addition, in the input image 300, it is supposed that a steering wheel 302 has red color, and that a background 303 has green color. The background 303 indicates a part except the person 301 and the steering wheel 302 in the entire input image 300.

In the input image 300, it is supposed that the steering wheel 302 and the arm part 301c are in focus, so that the focus degree of a pixel of the steering wheel 302 and the arm part 301c is larger than TH2. In addition, it is supposed that the focus degree of a pixel in the body part 301b of the person 301 is larger than TH1 and is TH2 or smaller, and that the focus degree of a pixel in the background 303 is 0 or larger and is TH1 or smaller. Hereinafter, a manner how the blurring process unit 69 performs the blurring process when the blurring filter is at a position 661 (e.g., the center of the blurring filter is at the position 661) will be described.

In FIG. 25, the target pixel of the blurring process is the pixel corresponding to the filter element m of the blurring filter. This target pixel is a pixel in a part of body 301b of the person 301 that exists in a gap in the steering wheel 302. Therefore, the focus degree of this target pixel is larger than TH1 and is TH2 or smaller as described above. Here, it is supposed that the focus degree of each of pixels corresponding to filter elements d, g, k, m, and q is larger than TH1 and is TH2 or smaller.

In addition, the focus degree of each of pixels corresponding to filter elements a, b, c, f, h, i, l, n, p, r, s, u, v, and w is larger than TH2 and 1 or smaller.

In addition, it is supposed that the focus degree of each of pixels corresponding to filter elements e, j, o, t, x, and y is 0 or larger and is TH1 or smaller.

In this case, the blurring process unit 69 sets the filter coefficient of the mask filter element corresponding to blurring filter elements a, b, c, f, h, i, l, n, p, r, s, u, v, and w to 0 in accordance with the rule [3-1], sets the filter coefficient of the mask filter element corresponding to blurring filter elements d, g, k, m, and q to 1 in accordance with the rule [3-2], and further sets the filter coefficient of the mask filter element corresponding to blurring filter elements e, j, o, t, x, and y to 0 in accordance with the rule [3-3], so as to generate the mask filter as illustrated in FIG. 26A. As illustrated in FIG. 26B, the blurring process unit 69 multiplies the filter coefficient of the blurring filter and the filter coefficient of the mask filter together so as to generate the corrected blurring filter. The blurring process unit 69 uses the generated corrected blurring filter for performing the blurring process on the target pixel at the position 661 (target pixel in input image 300).

According to the blurring process using the corrected blurring filter described above, the blurring process is performed using only the pixel value of the pixel having the focus degree in the same range as the target pixel (using only the pixel value of the pixel having the focus degree belonging to a small range that is the same as the small range to which the focus degree of the target pixel belongs). Therefore, it is possible to reduce a color migration that may occur when pixel values of pixels having different focus degrees are mixed. Therefore, in the input image 300, in the blurring process of the target pixel having blue color (pixel in a part of the body 301b having blue color existing in a gap in the steering wheel 302), a pixel having red color or green color at a large ratio is not used, but a pixel having blue color at a large ratio is used. Therefore, it is possible to reduce mixing of red color or green color into the target pixel after the blurring process.

<Blurring Process Example $7_D$>

The blurring process example $7_D$ will be described. Similarly to the blurring process examples $7_B$ and $7_C$, the blurring process unit 69 performs the mask process on the blurring filter on the basis of the focus degree of the pixel that is used in the blurring process by the blurring filter so as to generate the corrected blurring filter. Then, the blurring process unit 69 performs the blurring process on the input image using the corrected blurring filter. Hereinafter, a difference from the blurring process examples $7_B$ and $7_C$ will be described.

For instance, when an image of a scene where the focused subject is moving in the horizontal direction is input, the blurring process unit 69 performs the blurring process so as to have an effect of so-called "follow shot" for emphasizing speed feeling of the movement.

Figure 27A:
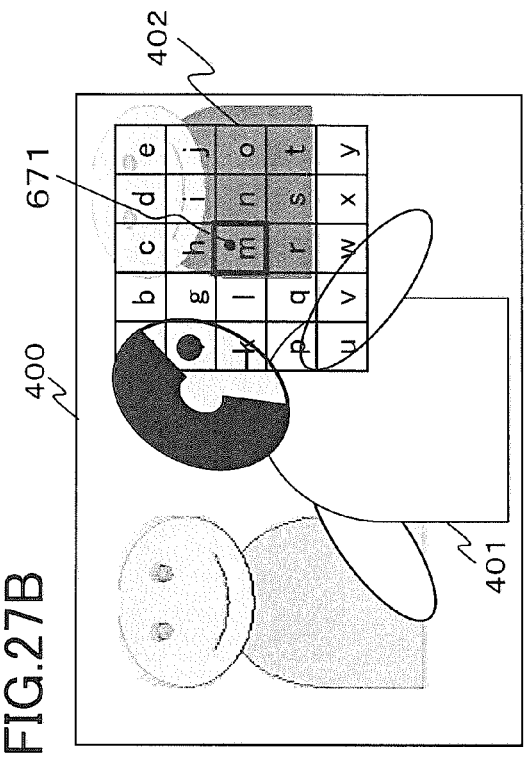
FIGS. 27A to 27D are diagrams illustrating an action of the blurring process unit in Example 7 of the present invention (blurring process example $7_D$).

FIGS. 27A to 27D are diagrams illustrating the blurring process having the follow shot effect performed by the blurring process unit 69. In FIG. 27A, it is supposed that a person 401 is in focus in an input image 400. The input image 400 is an image obtained by photographing a scene where the person 401 is moving in the horizontal direction from the left side to the right side.

As the position of the blurring filter moves in the direction (from the right side to the left side) opposite to the horizontal movement direction of the person 401 (direction from the left side to the right side), the blurring process unit 69 adds a column of new blurring filter elements to the tail end column of the blurring filter that is used for the blurring process so as to generate a new blurring filter. Note that the tail end column of the blurring filter means a tail end column in the case where the moving direction is opposite to the horizontal movement direction of the person 401.

Figure 27B:
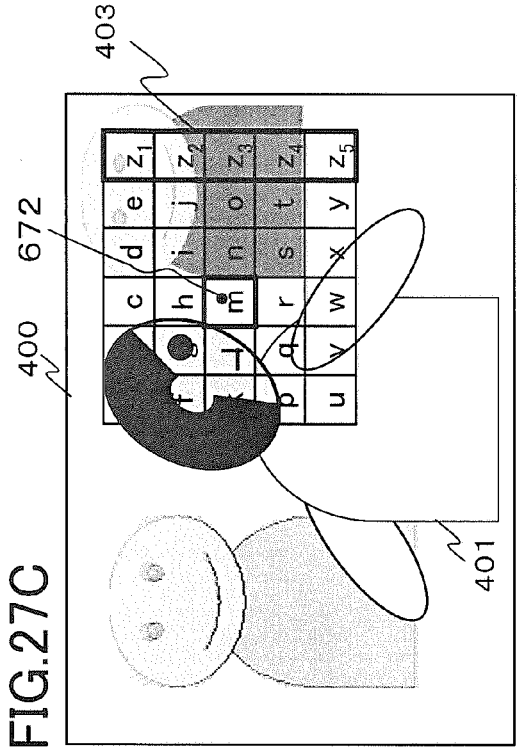
Figure 27C:
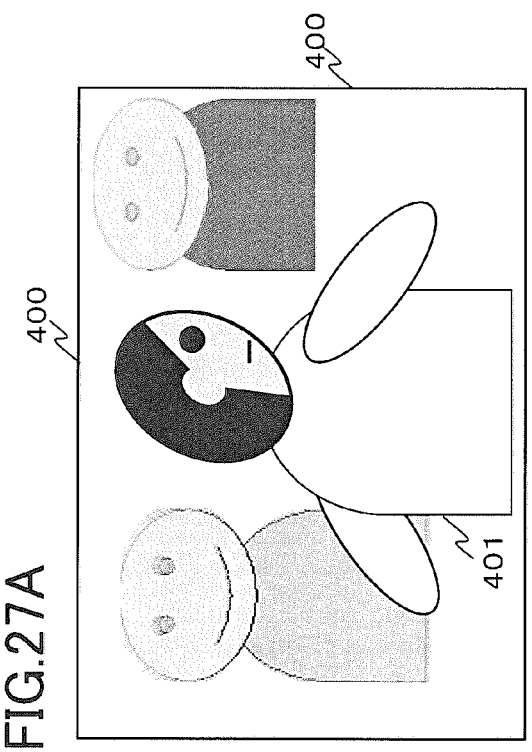

As illustrated in FIG. 27B, a filter size of the blurring filter 402 that is used by the blurring process unit 69 when it performs the blurring process on the target pixel at a position 671 (pixel corresponding to the filter element m) is 5×5. A position 672 illustrated in FIG. 27C is a position shifted from the position 671 to the left side by one pixel, and this shift can be considered to be corresponding to moving the blurring filter in the horizontal direction from the right side to the left side. A position 673 illustrated in FIG. 27D is a position shifted further from the position 672 to the left side by one pixel, and this shift can be considered to be corresponding to moving the blurring filter in the horizontal direction further from the right side to the left side.

As illustrated in FIG. 27C, when performing the blurring process on the target pixel at the position 672 shifted from the state of FIG. 27B to the left side by one pixel (pixel corresponding to the filter element m), the blurring process unit 69 adds a column including blurring filter elements $z_1$, $z_2$, $z_3$, $z_4$, and $z_5$ to the right end column of the blurring filter 402 (i.e., the column including blurring filter elements e, j, o, t, and y), so as to generate a blurring filter 403 having a filter size of 5×6. Then, a corrected blurring filter is generated by performing the mask process on the blurring filter 403, so that the corrected blurring filter is used for performing the blurring process.

Figure 27D:
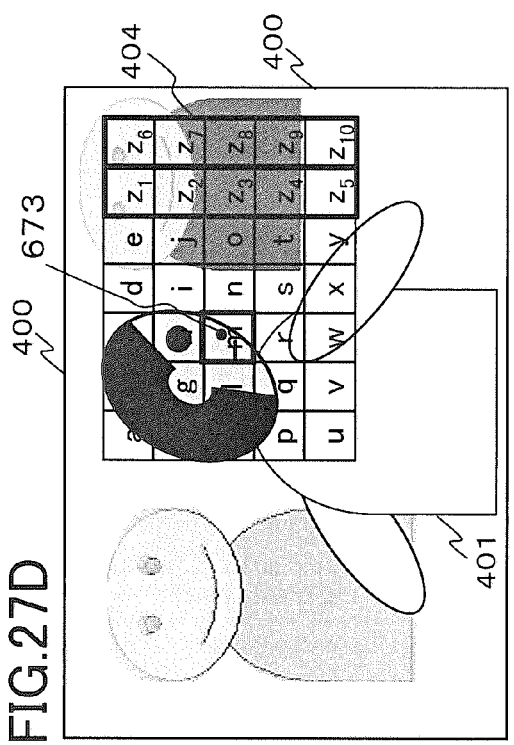

Further, as illustrated in FIG. 27D, when performing the blurring process on the target pixel at the position 673 shifted from the state of FIG. 27C to the left side by one pixel (pixel corresponding to the filter element m), the blurring process unit 69 adds a column including filter elements $z_6$, $z_7$, $z_8$, $z_9$, and $z_{10}$ to the right end column of the blurring filter 403 (i.e., a column including blurring filter elements $z_1$, $z_2$, $z_3$, $z_4$, and $z_5$), so as to generate a blurring filter 404 having a filter size of 5×7. Then, a corrected blurring filter is generated by performing the mask process on the blurring filter 404, so that the blurring process is performed using the corrected blurring filter.

Figure 28:
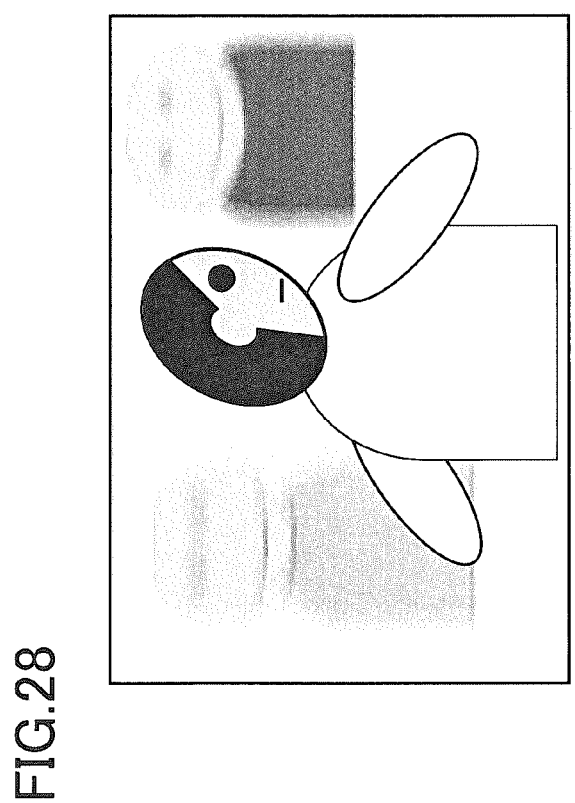
FIG. 28 is a diagram illustrating an effect of the blurring process by the blurring process unit in Example 7 of the present invention (blurring process example $7_D$).

FIG. 28 illustrates the blurred image generated by performing the blurring process on the input image 400 illustrated in FIG. 27A as described above.

In this way, in the case where the blurring process is performed on the input image of a scene where the focused specified subject is moving in the horizontal direction, when performing the blurring process on pixels arranged in the direction opposite to the horizontal movement direction of the specified subject, the blurring process unit 69 can enlarge (extend) the filter size of the blurring filter used for the blurring process in the horizontal movement direction of the specified subject as going to the opposite direction. Thus, it is possible to generate a blurred image in which speed feeling of the moving specified subject is emphasized.

<Blurring Process Example $7_E$>

The blurring process example $7_E$ will be described. Similarly to the blurring process examples $7_B$ and $7_C$, the blurring process unit 69 performs the mask process on the blurring filter on the basis of the focus degree of the pixel that is used in the blurring process by the blurring filter so as to generate the corrected blurring filter. Then, the blurring process unit 69 performs the blurring process on the input image using the corrected blurring filter. Hereinafter, a difference from the blurring process examples $7_B$ and $7_C$ will be described.

For instance, when the input image is an image of a scene where the focused subject is moving in the photographing direction toward the image sensing apparatus 1 when the image is taken, the blurring process unit 69 performs the blurring process so as to have an effect of so-called "zoom follow shot" for emphasizing speed feeling of the movement.

Figure 29:
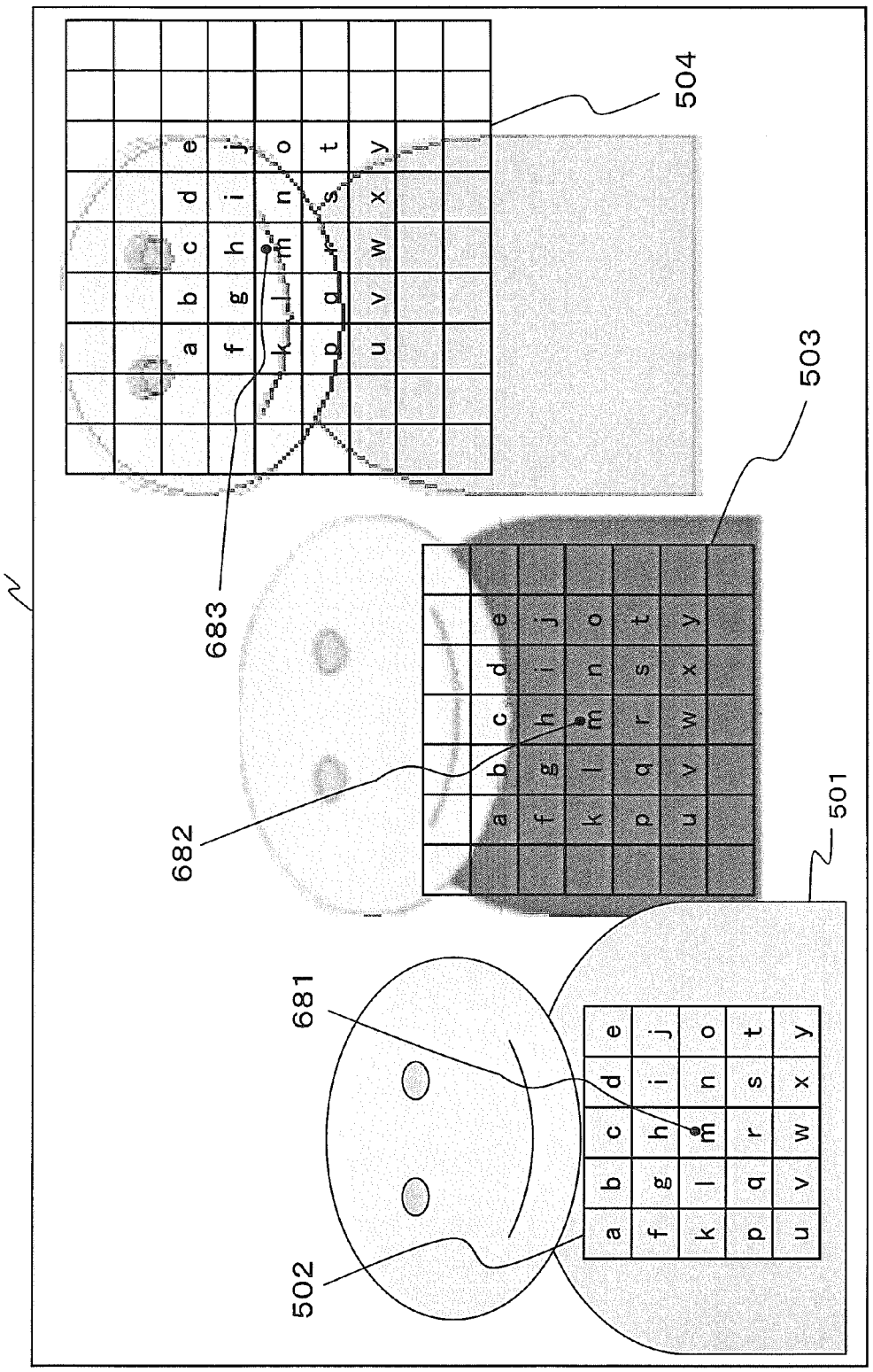
FIG. 29 is a diagram illustrating an action of the blurring process unit in Example 7 of the present invention (blurring process example $7_E$).

FIG. 29 is a diagram illustrating the blurring process having the zoom follow shot effect performed by the blurring process unit 69. In FIG. 29, an input image 500 is a taken image of a scene where the person 501 is moving in the photographing direction toward the image sensing apparatus 1 when the image is taken. It is supposed that the person 501 is in focus in the input image 500.

When the blurring process unit 69 performs the blurring process on a subject other than the person 501, it derives a position of the barycenter of the person 501, a size of the blurring filter that is used for the blurring process is set to be larger as being farther from the position of the barycenter. In other words, when the blurring process is performed on a pixel that is decided to be unfocused, a barycenter of a pixel group that is decided to be focused is derived, and a size of the blurring filter that is used for the blurring process is set to be larger as being farther from the barycenter.

In FIG. 29, a filter size of the blurring filter 502 that is used by the blurring process unit 69 for performing the blurring process on the target pixel at a position 681 (pixel corresponding to the blurring filter element m) is 5×5. Note that it is supposed that the pixel corresponding to the blurring filter element m of the blurring filter 502 is the barycenter of the person 501.

In FIG. 29, it is supposed that the target pixel at a position 682 (pixel corresponding to the filter element m) is a pixel that is decided to be unfocused. When the blurring process is performed on the target pixel at the position 682, the blurring process unit 69 sets the filter size of the blurring filter 503 to be used to 7×7. Further, the target pixel at a position 683 (pixel corresponding to the filter element m) is a pixel that is decided to be unfocused, and the target pixel at the position 683 is farther from the barycenter of the person 501 than the target pixel at the position 682 is. Therefore, when performing the blurring process on the target pixel at the position 683, the blurring process unit 69 sets the filter size of a blurring filter 504 to 9×9.

According to this blurring process, pixels that are decided to be unfocused have tendency to have larger blurring degree of the blurring process as being farther from the barycenter of the focused subject. Thus, it is possible to generate a blurred image in which speed feeling is emphasized when the focused subject is moving in the photographing direction toward the image sensing apparatus.

EXAMPLE 8

Figure 30:
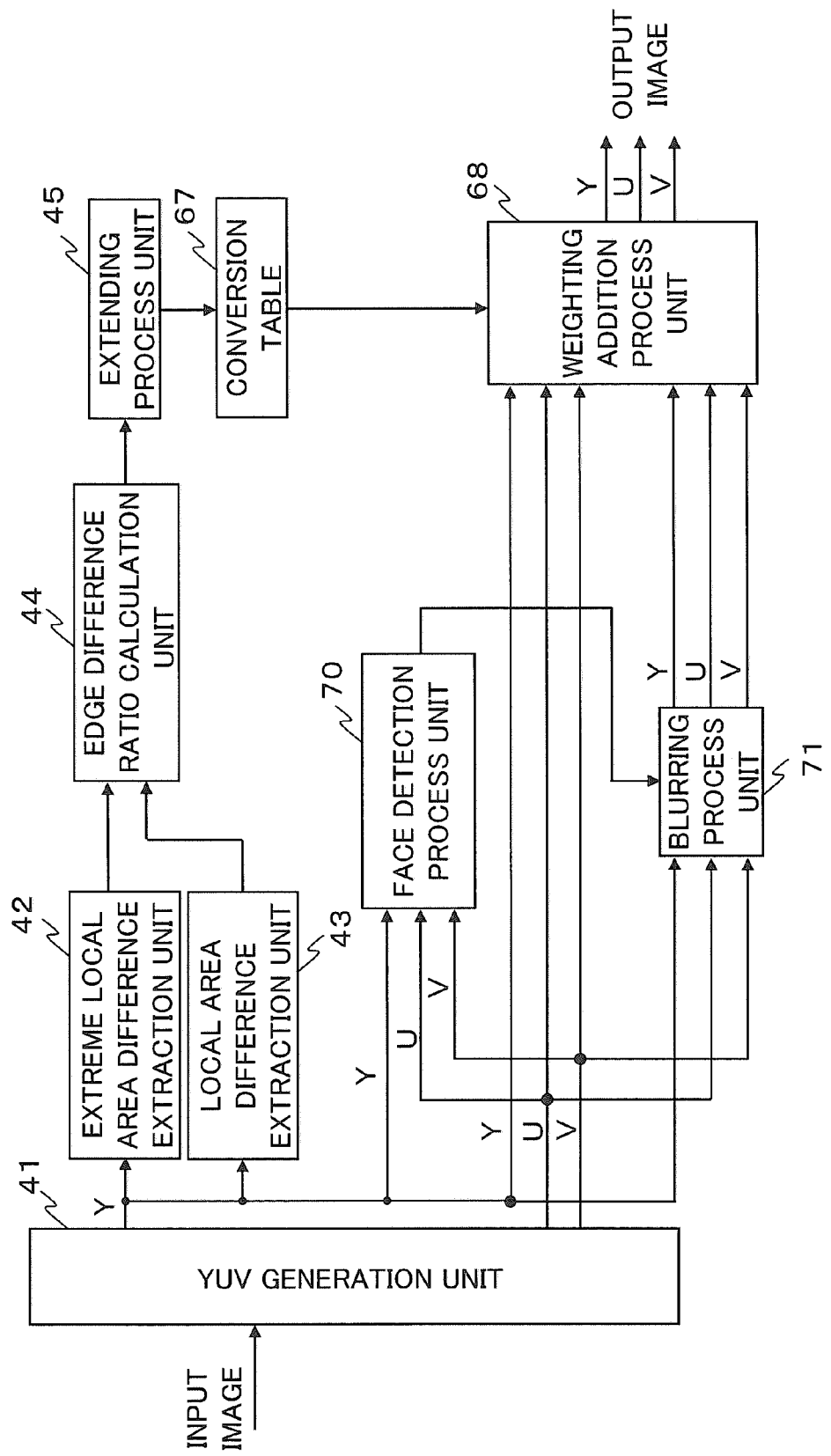
FIG. 30 is a diagram illustrating an action of the emphasized image generation process according to Example 8 of the present invention.

Example 8 will be described. FIG. 30 is a diagram illustrating Example 8 of the emphasized image generation process in the image processing unit 7. Individual portions illustrated in FIG. 30 may be disposed in the image processing unit 7. In FIG. 30, a part denoted by the same numeral as that in FIG. 17 is a part having the same function and action as the part of Example 6, and therefore descriptions of the function and the action are omitted.

In the case where the imaging target object includes a person, if the person's face is in focus and is relatively large in the taken image, it can be considered that the photographer intended to take the person as a main subject. For this taken image, to perform the blurring process with a larger blurring degree on a background image having a small focus degree (taken image of imaging target objects other than the main subject) is considered to be agreed with the photographer's intention.

In contrast, if the depth of field is large so that substantially all the imaging target objects are in focus, and if the person's face is relatively small in the taken image although the imaging target objects include the person, it is considered that the photographer intended to take all the imaging target objects including the person as main subjects. For this taken image, to perform the blurring process with a smaller blurring degree or not to perform the blurring process is considered to be agreed with the photographer's intention even if there is a part with a low focus degree.

In FIG. 30, a face detection process unit 70 detects a face image area of a person that is considered to be a noted subject from the input image, and adjusts the blurring degree by a blurring process unit 71 that will be described later, in accordance with a ratio $PR_{FACE}$ of the detected face image area in the entire input image area. The ratio $PR_{FACE}$ of the detected face image area in the entire input image area can be calculated, for example, by calculating a ratio of the number of pixels of the face image area to the total number of pixels in the input image. In other words, for example, a ratio of the number of pixels in the face image area to the total number of pixels in the input image can be determined as the ratio $PR_{FACE}$. The entire input image area means the entire image area of the input image.

If the ratio $PR_{FACE}$ of the detected face image area in the entire input image area is 30% or larger, for example, it is considered that the photographer intends to take a so-called portrait (image of person) in which the person is the main subject. On the contrary, if the ratio $PR_{FACE}$ of the detected face image area in the entire input image area is smaller than a predetermined reference ratio, for example, is smaller than 30%, it is considered that the photographer intends to take a so-called landscape (scenic image) in which all the imaging target objects are main subjects.

Therefore, if the ratio $PR_{FACE}$ of the detected face image area in the entire input image area is a predetermined reference ratio (i.e., a reference value) $PR_{REF}$ or larger, the face detection process unit 70 sets the blurring degree by the blurring process unit 71 that will be described later to a relatively large value so that the person is emphasized and enhanced in view. On the contrary, if the ratio $PR_{FACE}$ of the detected face image area in the entire input image area is smaller than the reference ratio $PR_{REF}$, the blurring degree by the blurring process unit 71 that will be described later is set to a relatively small value so that "bokeh" of the entire imaging target objects become small or zero. In this case, the blurring degree may be reduced to zero. More specifically, if the ratio $PR_{FACE}$ is smaller than the reference ratio $PR_{REF}$, the blurring degree is set to a smaller value than the case where the ratio $PR_{FACE}$ is the reference ratio $PR_{REF}$ or larger, or the blurring degree is set to zero. With this process, when the photographer takes the image in which the person is regarded as a main subject, it is possible to obtain a taken image in which the person is more emphasized. In contrast, when the photographer takes the image in which the entire imaging target objects are regarded as the main subjects, it is possible to obtain an original taken image in which the depth of field is large, namely an image that is substantially the same as the original taken image in which the entire imaging target objects are in focus.

When the face detection process unit 70 has detected a plurality of persons' faces in the input image, it selects a person's face that is agreed with a preset condition from the plurality of persons' faces, such as a person's face having the largest face image area, a person's face existing at the nearest position from the center of the input image, or a person's face having the highest average value of the corrected edge difference ratios output from the extending process unit 45, so that the ratio $PR_{FACE}$ can be determined on the basis of the face image area of the selected person's face.

In FIG. 30, the blurring process unit 71 performs the blurring process on the input image and outputs the input image after the blurring process as the blurred image. The blurring process unit 71 can adopt as the blurring filter, for example, an averaging filter that smoothes a change of density between neighboring pixel signals or a low pass filter (LPF) that removes high frequency components while maintaining low frequency components among spatial frequency components contained in the image signal. As the averaging filter or the LPF described above, for example, it is possible to use those described in the document "Digital Image Processing" published by CG-ARTS Association on Mar. 1, 2007, second edition, pp. 108-110 and 131-133.

The blurring process unit 71 can increase the blurring degree by increasing the filter size of the blurring filter, and can decrease the blurring degree by decreasing the filter size, oppositely. In addition, in the blurring filter as the spatial domain filter, the blurring degree can be set to zero by setting one to the filter coefficient for the target pixel and setting zero to all the filter coefficients for pixels other than the target pixel. Other than that, for example, in the case where the filter size of the blurring filter is fixed to 7×7, the blurring degree can be increased by setting a larger value to the filter coefficient as being farther from the target pixel. On the contrary, the blurring degree can be decreased by setting a larger value to the filter coefficient as being closer to the target pixel.

When a signal indicating that the ratio $PR_{FACE}$ of the detected face image area in the entire input image area is the predetermined reference ratio $PR_{REF}$ or larger is supplied from the face detection process unit 70, the blurring process unit 71 sets the filter size of the blurring filter to 7×7, for example. On the contrary, when a signal indicating that the ratio $PR_{FACE}$ of the detected face image area in the entire input image area is smaller than the predetermined reference ratio $PR_{REF}$ or a signal indicating that a face image area is not detected is supplied from the face detection process unit 70, the blurring process unit 71 sets the filter size of the blurring filter to 3×3, for example, or sets one to the filter coefficient for the target pixel and zero to all the filter coefficients of pixels other than the target pixel in the blurring filter.

Note that, as a matter of course, in FIG. 5 of Example 1, FIG. 10 of Example 2, FIG. 12 of Example 3, FIG. 13 of Example 4, and FIG. 15 of Example 5, it is possible to use the conversion table 67, the face detection process unit 70, the blurring process unit 71, and the weighting addition process unit 68 illustrated in FIG. 30 instead of the conversion table 46, the blurring process unit 47, and the edge emphasizing process unit 48.

When Example 2, 4, or 5 is modified, the frequency component ratio is supplied to the conversion table 67, and the horizontal axis of the function of the conversion table 67 illustrated in FIG. 18 becomes the frequency component ratio. When Example 3 is modified, the horizontal frequency component ratio or the vertical frequency component ratio is supplied to the conversion table 67, and the horizontal axis of the function of the conversion table 67 illustrated in FIG. 18 becomes the horizontal frequency component ratio or the vertical frequency component ratio.

The face detection process performed by the face detection process unit 70 will be described. In FIG. 30, the face detection process unit 70 is supplied with image signals of the input image, which includes the Y, U, and V signals. The face detection process unit 70 detects a face of person from the input image on the basis of the image signal of the input image, so that a face area including the detected face is extracted. The face area is the same as the face image area described above. There are known various methods of detecting a face included in the image, and the face detection process unit 70 can adopt any of the methods. For instance, as the method described in JP-A-2000-105819, a face (face area) can be detected by extracting a skin color area from the input image. Alternatively, a face (face area) can be detected by using the method described in JP-A-2006-211139 or JP-A-2006-72770.

Typically, for example, an image of a noted area set in the input image is compared with a reference face image having a predetermined image size so that similarity between the images is decided, and it is detected whether or not the noted area includes a face (whether or not the noted area is the face area) on the basis of the similarity. In the input image, the noted area is shifted one by one pixel in the left and right direction or in the up and down direction. Then, the image of the shifted noted area is compared with the reference face image, and similarity between the images is decided again, so that the same detection is performed. In this way, the noted area is updated and set while being shifted one by one pixel from the upper left to the lower right direction in the input image, for example. In addition, the input image is reduced by a constant ratio, and the same face detection process is performed on the reduced image. By repeating this process, a face having any size can be detected from the input image. This face detection method is described in detail in JPA-2007-265390.

Although Example 8 describes an action example in which an image of a person's face is noted, a similar action can be realized for an image of an animal face without limiting to an image of a person's face.

EXAMPLE 9

Example 9 will be described. In FIG. 5 of Example 1, FIG. 10 of Example 2, FIG. 12 of Example 3, FIG. 13 of Example 4, and FIG. 15 of Example 5, the extending process unit 45 may deliver the corrected edge difference ratio not only to the conversion table 46 but also to the blurring process unit 47. In this case, the blurring process unit 47 counts the number of the corrected edge difference ratios having a predetermined value or a larger value. When the ratio of the count value to the total number of pixels in the input image is a predetermined ratio or larger, the blurring process unit 47 may perform the blurring process after setting the blurring degree based on the output from the conversion table 46 to a larger value. On the contrary, when the ratio of the count value to the total number of pixels in the input image is smaller than the predetermined ratio, the blurring process unit 47 may perform the blurring process after setting the blurring degree based on the output from the conversion table 46 to a smaller value or setting the blurring degree to zero.

EXAMPLE 10

Example 10 will be described. In FIG. 17 of Example 6, for example, the extending process unit 45 may deliver the corrected edge difference ratio not only to the conversion table 67 but also to the blurring process unit 66. In this case, the blurring process unit 66 counts the number of corrected edge difference ratios having a predetermined value or larger. When the ratio of the count value to the total number of pixels in the input image is a predetermined ratio or larger, the blurring process unit 66 increases the blurring degree for performing the blurring process. On the contrary, when the ratio is smaller than the predetermined ratio, the blurring degree is decreased, or the blurring degree is set to zero for performing the blurring process.

According to Example 9 and Example 10, for the input image having a relatively large number of corrected edge difference ratios having a predetermined value or larger, namely for the input image having a relatively large focused subject, an image in which the unfocused background image is further blurred can be obtained as the output image. On the contrary, for the input image having a relatively small number of corrected edge difference ratios having the predetermined value or larger, namely for the input image having a relatively small focused subject, an image that is close to the original input image can be obtained as the output image.

As described above, according to the present invention, concerning an input image that is a set of a plurality of small areas, a focus degree is derived for each small area, and an image signal of the small area can be reduced for each small area in accordance with the focus degree. Specifically, for example, as the focus degree is smaller, high frequency components of the corresponding image signal may be reduced. Otherwise, as the focus degree is smaller, the Y signal as the luminance signal or the U and V signals that can also be called color saturation signals may be reduced. A focus degree of a certain small area can be considered as a degree indicating what extent the image signal of the small area is shifted from the image signal of the focused small area. In addition, as described above, each of the small areas can be considered to be constituted of one or more pixels.

With this process, for example, the background of the input image 100 (including the building 102) is blurred while the person 101 is emphasized. As a result, the photographer of the image sensing apparatus 1 can obtain the emphasized image with "bokeh" in which the person 101 is enhanced.

In addition, for example, it can be considered as follows. In FIG. 30, the portion including the face detection process unit (face area detection unit) 70 and the blurring process unit 71 works as the second-taken image generation unit which generates the blurred image as a second taken image from the input image as a first taken image. The image sensing unit that obtains the input image by taking an image can be considered to include the lens unit 3 and the image sensor 2. As a structure of the focus degree deriving unit that derives the focus degree in each small area of the input image, various structures are described above. For instance, in the example illustrated in FIG. 30, it can be considered that the extraction unit 42, the extraction unit 43, and the calculation unit 44 are included in the focus degree deriving unit as its elements. In addition, for example, in each example described above, it may be considered that information supplied to the extending process unit 45 (e.g., the edge difference ratio or the frequency component ratio before the extending process) or information output from the extending process unit 45 (e.g., the edge difference ratio or the frequency component ratio after the extending process) expresses the focus degree. The weighting addition process unit 68 is one type of the combination process unit that mixes the image signal of the input image with the image signal of the blurred image so as to generate the image signal of the output image. This mixing action means mixing of the image signal of the small area in the input image and the image signal of the corresponding small area in the blurred image, and is performed for each small area of the input image and is performed in accordance with the corresponding focus degree. In other words, the combination process unit performs, for each small area, the combination process in which the image signal of the input image and the image signal of the blurred image are mixed in accordance with the focus degree, so that the image signal of the output image can be generated for each small area. The output image can be recorded in the external memory 22 as a recording unit.

What is claimed is:

1. An image processing apparatus comprising:
    a second-taken image generation unit which performs a blurring process on a first taken image including a plurality of small areas so as to generate a second taken image including a plurality of second small areas;
    a focus degree deriving unit which derives a focus degree of each small area of the first taken image; and
    a combination process unit which combines each small area of the first taken image with each second small area of the second taken image corresponding to each small area of the first taken image,
    wherein the combination process unit sets a mixing ratio of the second taken image in the combination to a larger value as a focus degree of each small area derived by the focus degree deriving unit is smaller, and
    the second-taken image generation unit includes a face area detection unit which detects a face image area from the first taken image, and a blurring process unit which performs the blurring process on the first taken image on the basis of the detected face image area so as to generate the second taken image.

2. An image processing apparatus according to claim 1, wherein
    the blurring process unit sets different blurring degrees for the blurring process between the case where a ratio of the detected face image area to a first taken image area is a predetermined ratio or larger and the case where the ratio is smaller than the predetermined ratio, and
    the blurring process unit sets the blurring degree in the case where the ratio of the detected face image area to the first taken image area is the predetermined ratio or larger to a larger value than the blurring degree in the case where the ratio of the detected face image area to the first taken image area is smaller than the predetermined ratio.

3. An image processing apparatus according to claim 2, wherein the blurring degree in the case where the ratio of the detected face image area to the first taken image area is smaller than the predetermined ratio includes zero.

4. An image processing apparatus according to claim 1, wherein the focus degree deriving unit derives the focus degree of each small area in accordance with a transition pattern of a luminance signal in the each small area.

5. An image processing apparatus according to claim 1, wherein the focus degree deriving unit derives the focus degree of each small area in accordance with frequency components contained in a luminance signal of the each small area.

6. An image sensing apparatus comprising: an image sensing unit which obtains a first taken image including a plurality of small areas by taking an image; an image processing apparatus according to claim 1; and a recording unit which records an output image generated by the image processing apparatus.

* * * * *